United States Patent
Lim et al.

(10) Patent No.: US 12,219,036 B2
(45) Date of Patent: Feb. 4, 2025

(54) METHOD AND DEVICE FOR IDENTIFYING PACKET IN WIRELESS LAN SYSTEM

(71) Applicant: LG ELECTRONICS INC., Seoul (KR)

(72) Inventors: Dongguk Lim, Seoul (KR); Eunsung Park, Seoul (KR); Sunwoong Yun, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/202,452

(22) Filed: May 26, 2023

(65) Prior Publication Data

US 2023/0300225 A1 Sep. 21, 2023

Related U.S. Application Data

(63) Continuation of application No. 17/742,097, filed on May 11, 2022, now Pat. No. 11,706,322, which is a
(Continued)

(30) Foreign Application Priority Data

Jul. 3, 2018 (KR) .......................... 10-2018-0077337
Jul. 19, 2018 (KR) .......................... 10-2018-0084380

(51) Int. Cl.
*H04L 27/18* (2006.01)
*H04L 69/22* (2022.01)
*H04W 84/12* (2009.01)

(52) U.S. Cl.
CPC .............. *H04L 69/22* (2013.01); *H04L 27/18* (2013.01); *H04W 84/12* (2013.01)

(58) Field of Classification Search
None
See application file for complete search history.

(56) References Cited

U.S. PATENT DOCUMENTS

2016/0112899 A1 4/2016 Kenney et al.
2017/0181136 A1* 6/2017 Bharadwaj ............ H04W 72/12
(Continued)

FOREIGN PATENT DOCUMENTS

CN 107079458 8/2017
WO 2016099139 6/2016

OTHER PUBLICATIONS

The State Intellectual Property Office of the People's Republic of China Application Serial No. 201980045114.9, Patent Certificate dated May 30, 2023, 45 pages.
(Continued)

*Primary Examiner* — Duc T Duong
(74) *Attorney, Agent, or Firm* — LEE, HONG, DEGERMAN, KANG & WAIMEY

(57) ABSTRACT

An example according to the present disclosure relates to a technique for identifying a wireless LAN (WLAN) packet. For example, when a physical protocol data unit (PPDU) includes a legacy signal field, a field contiguous to the legacy signal field may be used to identify a type of the PPDU. A field contiguous to the legacy signal field may include information indicating that the PPDU is an extreme high throughput (EHT) PPDU. The field contiguous to the legacy signal field may include at least one of information related to a frame format, a transmission opportunity, an STA ID, and/or a bandwidth.

16 Claims, 19 Drawing Sheets

Related U.S. Application Data continuation of application No. 17/256,868, filed as application No. PCT/KR2019/008042 on Jul. 2, 2019, now Pat. No. 11,349,966.

(56) References Cited

U.S. PATENT DOCUMENTS

| | | | |
|---|---|---|---|
| 2018/0014329 A1* | 1/2018 | Lee | H04L 5/0092 |
| 2019/0334590 A1* | 10/2019 | Son | H04B 7/0452 |
| 2020/0228634 A1* | 7/2020 | Noh | H04L 69/22 |
| 2021/0014788 A1* | 1/2021 | Sahin | H04W 52/0219 |

OTHER PUBLICATIONS

Ericsson, "Discussion on the Number of UEs for DL-only LAA Using a Bandwidth of 80 MHz," 3GPP TSG-RAN WG1 #82, R1-154627, Aug. 2015, 5 pages.

* cited by examiner

PPDU Format (IEEE 802.11a/g)

HT PPDU Format (IEEE 802.11n)

VHT PPDU Format (IEEE 802.11ac)

METHOD AND DEVICE FOR IDENTIFYING PACKET IN WIRELESS LAN SYSTEM

CROSS-REFERENCE TO RELATED APPLICATIONS

This application is a continuation of U.S. patent application Ser. No. 17/742,097, filed on May 11, 2022, which is a continuation of U.S. patent application Ser. No. 17/256,868, filed on Dec. 29, 2020, now U.S. Pat. No. 11,349,966, which is the National Stage filing under 35 U.S.C. 371 of International Application No. PCT/KR2019/008042, filed on Jul. 2, 2019, which claims the benefit of Korean Patent Application Nos. 10-2018-0077337, filed on Jul. 3, 2018 and 10-2018-0084380, filed on Jul. 19, 2018, the contents of which are all hereby incorporated by reference herein in their entirety.

BACKGROUND

Technical Field

The present disclosure relates to a technique for transmitting and receiving data in wireless communication, and more particularly, to a method and apparatus for configuring and receiving an identifiable packet in a wireless LAN system.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

This disclosure proposes technical features which may improve the existing IEEE 802.11ax standard or which may be used in a new communication standard. For example, the new communication standard may be an extreme high throughput (EHT) standard currently under discussion. The EHT standard may use a newly proposed increased bandwidth, an improved PPDU structure, an improved sequence, a hybrid automatic repeat request (HARQ) technique, etc.

Meanwhile, in the IEEE standard, various types or formats of physical protocol data units (PPDU) have been defined. The transmitting/receiving STA (station) used an auto-detection rule to identify the type/format of the transmitted/received PPDU.

SUMMARY

With a new wireless LAN standard being discussed, it is necessary to discuss a method and apparatus for identifying a new type of packet. In a wireless LAN system, backward compatibility should be supported, and thus, a new packet type should be easily distinguished from a legacy packet. The present disclosure proposes a method/apparatus for configuring a new type of packet and a method/apparatus for determining whether a received packet is a new type of packet.

Specifically, signals of the new wireless LAN standard may be used together with signals of the conventional standard. Here, if the signals of the new WLAN standard are not easily distinguished from the conventional signals, unnecessary power consumption may occur in a receiving device and communication system performance of the WLAN system may be degraded. An example according to the present disclosure may solve this problem.

An example according to the present disclosure relates to a method and/or apparatus for a wireless local area network (WLAN) system.

For example, a receiving device may receive a physical protocol data unit (PPDU).

The PPDU may include a legacy signal field, a control signal field contiguous to the legacy signal field, and a data field.

The legacy signal field and the control signal field may be generated based on binary phase shift keying (BPSK).

The legacy signal field may be generated based on a first signal bit.

The control signal field may be generated based on a second signal bit.

The second signal bit may include first control information related to whether the PPDU is an extreme high throughput (EHT) PPDU.

The second signal bit may include second control information related to whether a bandwidth of the PPDU is greater than or equal to a first bandwidth.

The receiving device may determine whether the PPDU is an EHT PPDU based on the first control signal field.

In an example according to the present disclosure, a newly defined packet may be easily configured in a wireless LAN system and a newly defined packet may be easily identified/detected. Through an example of the present disclosure, it is possible for a newly defined packet and a legacy packet to efficiently coexist.

Specifically, an example of the present disclosure proposes a signal of a new WLAN standard which is easily distinguished from a legacy signal. Through this, an example of the present disclosure may prevent unnecessary power consumption in the receiving device and improve communication system performance of the WLAN system.

DESCRIPTION OF EXEMPLARY EMBODIMENTS

A forward slash (/) or comma used in this disclosure may refer to "and/or". For example, since "A/B" refers to "A and/or B", it may refer to "only A" or "only B" or "either A or B". In addition, technical features that are individually described in one drawing may be implemented individually or simultaneously.

In addition, parentheses used in this disclosure may refer to "for example". Specifically, when "control information (EHT-Signal)" is indicated, "EHT-Signal" may be proposed as an example of "control information". In addition, even when indicated as "control information (i.e., EHT-signal)", "EHT-signal" may be proposed as an example of "control information".

The following example of the present disclosure may be applied to various wireless communication systems. For example, the following example of the present disclosure may be applied to a wireless local area network (WLAN) system. For example, this disclosure may be applied to the IEEE 802.11a/g/n/ac standards or the IEEE 802.11ax standard. In addition, this disclosure may be applied to a newly proposed EHT standard or IEEE 802.11be standard. In addition, an example of the present disclosure may be applied to the EHT standard or to a new WLAN standard which enhances IEEE 802.11.

Hereinafter, in order to describe the technical features of the present disclosure, technical characteristics of the WLAN system to which the present disclosure may be applied will be described.

Figure 1:
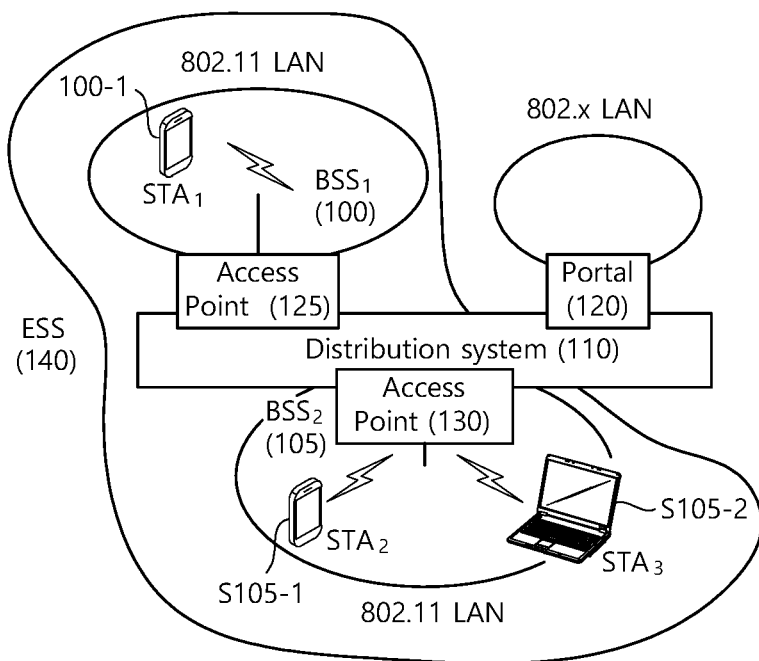
FIG. 1 is a conceptual view illustrating a structure of a WLAN.
Figure 1:
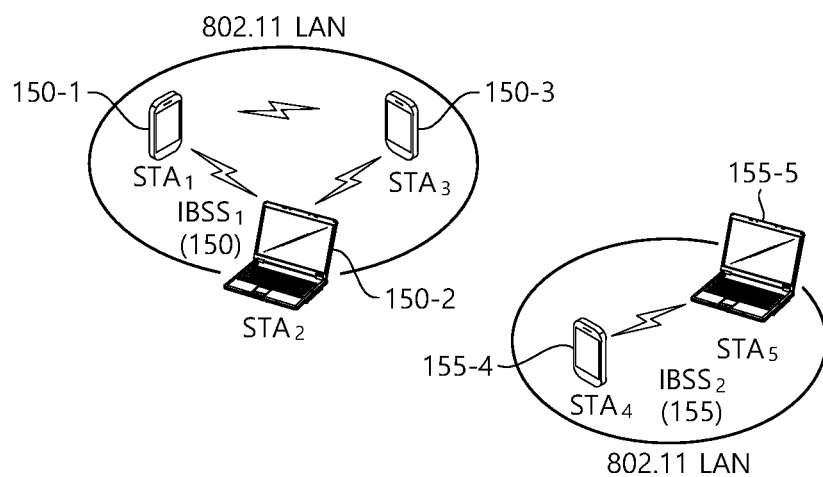

FIG. 1 is a conceptual view illustrating a structure of a WLAN.

The upper part of FIG. 1 illustrates a structure of the infrastructure basic service set (BBS) of institute of electrical and electronic engineers (IEEE) 802.11.

Referring to the top of FIG. 1, the wireless LAN system may include one or more infrastructure BSSs 100 and 105 (hereinafter, BSS). The BSSs 100, and 105 are a set of an access point (AP) and a station (STA) such as an AP 125 and an STA1 100-1 which may be successfully synchronized to communicate with each other and does not indicate a specific region. The BSS 105 may include one or more STAs 105-1 and 105-2 which may be coupled to one AP 130.

The BSS may include at least one STA, APs 125 and 130 providing a distribution service, and a distribution system (DS) 110 connecting a plurality of APs.

The distribution system 110 may implement an extended service set (ESS) 140 by connecting several BSSs 100 and 105. The ESS 140 may be used as a term indicating one network formed by connecting one or more APs 125 and 230 through the distribution system 110. APs included in one ESS 140 may have the same service set identification (SSID).

A portal 120 may serve as a bridge for connecting a wireless LAN network (IEEE 802.11) and another network (e.g., 802.X).

In the BSS as shown at the top of FIG. 1, a network between the APs 125 and 130 and a network between the APs 125 and 130 and the STAs 100-1, 105-1, and 105-2 may be implemented. However, it is also possible for STAs to perform communication by setting a network without the APs 125 and 130. A network established between the STAs to perform communication without the APs 125 and 130 is defined as an ad-hoc network or an independent basic service set (IBSS).

The bottom of FIG. 1 is a conceptual view illustrating an IBS S.

Referring to the bottom of FIG. 1, the IBSS is a BSS operating in an ad-hoc mode. Since IBSS does not include an AP, there is no centralized management entity which performs a management function at the center. That is, in the IBSS, the STAs 150-1, 150-2, 150-3, 155-4, and 155-5 are managed in a distributed manner. In the IBSS, all STAs 150-1, 150-2, 150-3, 155-4, and 155-5 may be configured as mobile STAs and form a self-contained network because access to the distribution system is not allowed.

An STA is an arbitrary functional medium including a medium access control (MAC) in accordance with the IEEE (Institute of Electrical and Electronics Engineers) 802.11 standard and a physical layer interface regarding a wireless medium. In a broad sense, the STA may include an AP and a non-AP STA.

The STA may be referred to as various names such as a mobile terminal, a wireless device, a wireless transmit/receive unit (WTRU), a user equipment (UE), a mobile station (MS), a mobile subscriber unit, or, simply, a user.

Figure 2:
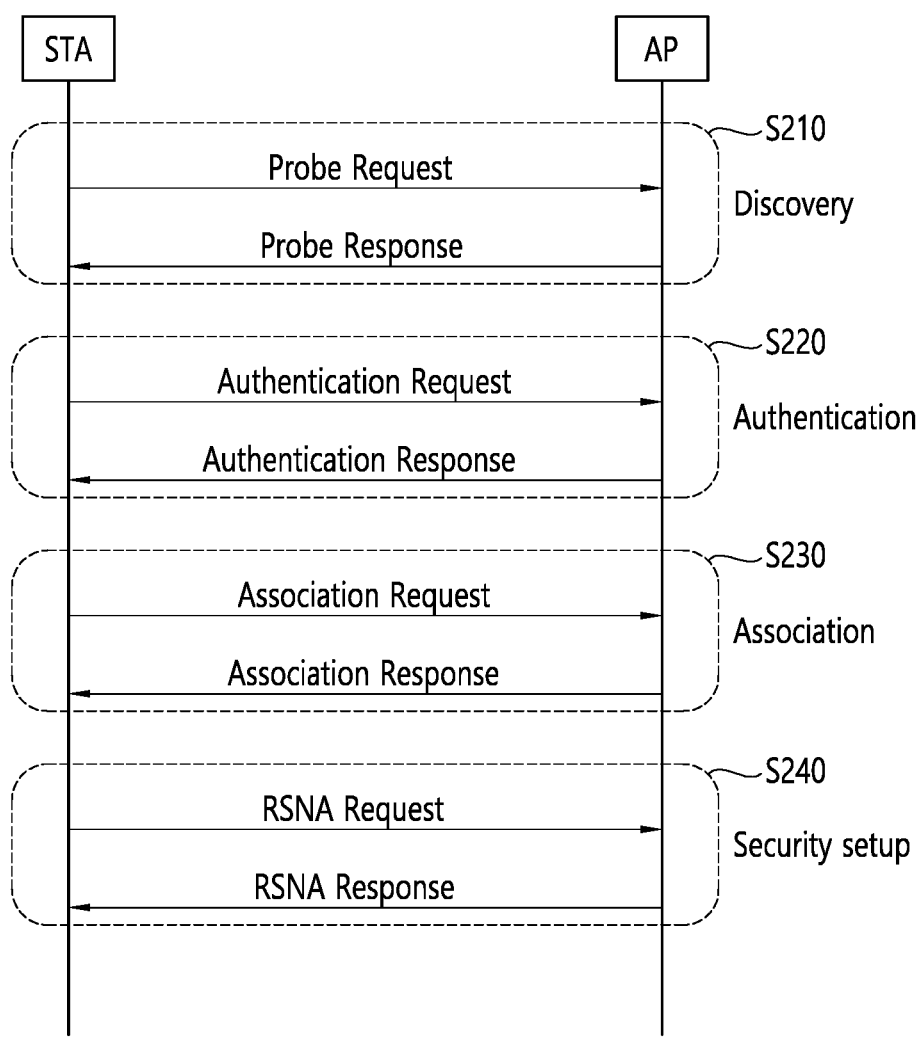
FIG. 2 is a view illustrating a general link setup process.

FIG. 2 is a view illustrating a general link setup process.

In step S210, the STA may perform a network discovery operation. The network discovery operation may include a scanning operation of the STA. That is, in order for the STA to access the network, the STA should find a participable network. The STA should identify a compatible network before participating in the wireless network, and a process of identifying a network existing in a specific area is called scanning. Scanning methods include active scanning and passive scanning.

FIG. 2 illustrates a network discovery operation including an active scanning process. In active scanning, an STA performing scanning transmits a probe request frame to discover an AP present in the vicinity, while moving channels, and waits for a response thereto. A responder transmits a probe response frame in response to the probe request frame to the STA that has transmitted the probe request frame. Here, the responder may be an STA that has last transmitted a beacon frame in the BSS of a channel being scanned. In the BSS, since the AP transmits the beacon frame, the AP is a responder, and in the IBS S, the responder is not constant because the STAs in the IBSS transmit beacon frames by taking turns. For example, an STA, which has transmitted a probe request frame on channel #1 and has received a probe response frame on channel #1, may store BSS-related information included in the received probe response frame, move to a next channel (e.g., channel #2), and perform scanning (i.e., probe request/response transmission/reception) on channel #2) in the same manner.

Although not illustrated in the example of FIG. 2, the scanning operation may be performed by a passive scanning method. An STA, which performs scanning based on passive scanning, may wait for a beacon frame, while moving channels. The beacon frame, one of the management frames in IEEE 802.11, indicates the presence of a wireless network and is periodically transmitted so that the STA may find the wireless network and participate in the wireless network. In the BSS, the AP serves to periodically transmit a beacon frame, and in the IBSS, STAs transmit the beacon frame by taking turns. When the STA, performing the scanning, receives the beacon frame, the STA stores information related to the BSS included in the beacon frame and records beacon frame information in each channel, while moving to other channels. The STA receiving the beacon frame may store the BSS-related information included in the received beacon frame, move to a next channel, and perform scanning in the next channel in the same manner.

The STA that discovers the network may perform an authentication process in step S220. This authentication process may be referred to as a first authentication process in order to clearly distinguish it from a security setup operation of step S240 to be described later. The authentication process of S220 may include a process in which the STA transmits an authentication request frame to the AP, and in response thereto, the AP transmits an authentication response frame to the STA. An authentication frame used for authentication request/response corresponds to a management frame.

The authentication frame may include information related to an authentication algorithm number, an authentication transaction sequence number, status code, challenge text, a robust security network (RSN), and a finite cyclic group.

The STA may transmit an authentication request frame to the AP. The AP may determine whether to allow authentication for the corresponding STA based on information included in the received authentication request frame. The AP may provide a result of processing authentication to the STA through an authentication response frame.

The successfully authenticated STA may perform an association process based on step S230. The association process includes a process in which the STA transmits an association request frame to the AP, and in response thereto, the AP transmits an association response frame to the STA. For example, the association request frame may include information related to various capabilities, beacon listen intervals, service set identifiers (SSIDs), supported rates, supported channels, an RSN, a mobility domain, supported operating classes, traffic indication map (TIM) broadcast requests, interworking (interworking) service capability, and the like. For example, the association response frame may include information related to various capabilities and information related to status codes, association IDs (AIDs), support rates, enhanced distributed channel access (EDCA) parameter sets, received channel power indicators (RCPIs), received signal to noise Indicators (RSNIs), mobility domains, timeout intervals (association comeback time), overlapping BSS scan parameters, TIM broadcast responses, QoS maps, and the like.

Subsequently, in step S240, the STA may perform a security setup process. The security setup process of step S240 may include, for example, a process of performing a private key setup through 4-way handshaking through an extensible authentication protocol over LAN (EAPOL) frame.

Figure 3:
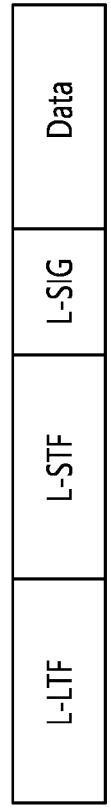
FIG. 3 is a view illustrating an example of a physical protocol data unit (PPDU) used in the IEEE standard.
Figure 3:
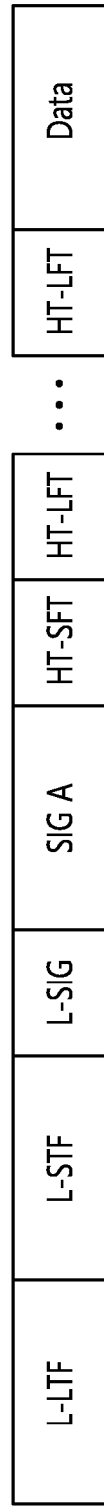
Figure 3:
Figure 3:
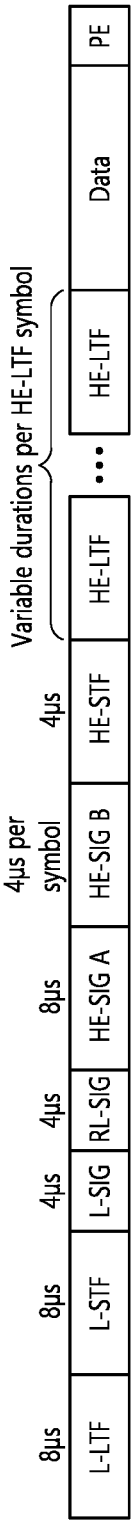

FIG. 3 is a view illustrating an example of a physical protocol data unit (PPDU) used in the IEEE standard.

As illustrated, in standards such as IEEE a/g/n/ac, various types of physical protocol data units (PPDUs) were used. Specifically, the LTF and STF fields included training signals, SIG-A and SIG-B included control information for a receiving station, and the data field included user data corresponding to PSDU (MAC PDU/Aggregated MAC PDU).

In addition, FIG. 3 also includes an example of an HE PPDU of the IEEE 802.11ax standard. The HE PPDU according to FIG. 3 is an example of a PPDU for multiple users, HE-SIG-B is included only for multiple users, and the corresponding HE-SIG-B may be omitted in the PPDU for a single user.

As illustrated, the HE-PPDU for multiple users (MU) may include a legacy-short training field (L-STF), a legacy-long training field (L-STF), a legacy-signal (L-SIG), a high efficiency-signal A (HE-SIG-A), a high efficiency-signal-B (HE-SIG-B), a high efficiency-short training field (HE-STF), a high efficiency-long training field (HE-LTF), a data field (or MAC payload), and a packet extension (PE) field. Each field may be transmitted during the illustrated time period (i.e., 4 or 8 µs, etc.).

Hereinafter, a resource unit (RU) used in the PPDU will be described. The resource unit may include a plurality of subcarriers (or tones). The resource unit may be used when transmitting signals to multiple STAs based on an OFDMA technique. Also, the resource unit may be defined even when a signal is transmitted to one STA. The resource unit may be used for the STF, the LTF, the data field, and the like.

Figure 4:
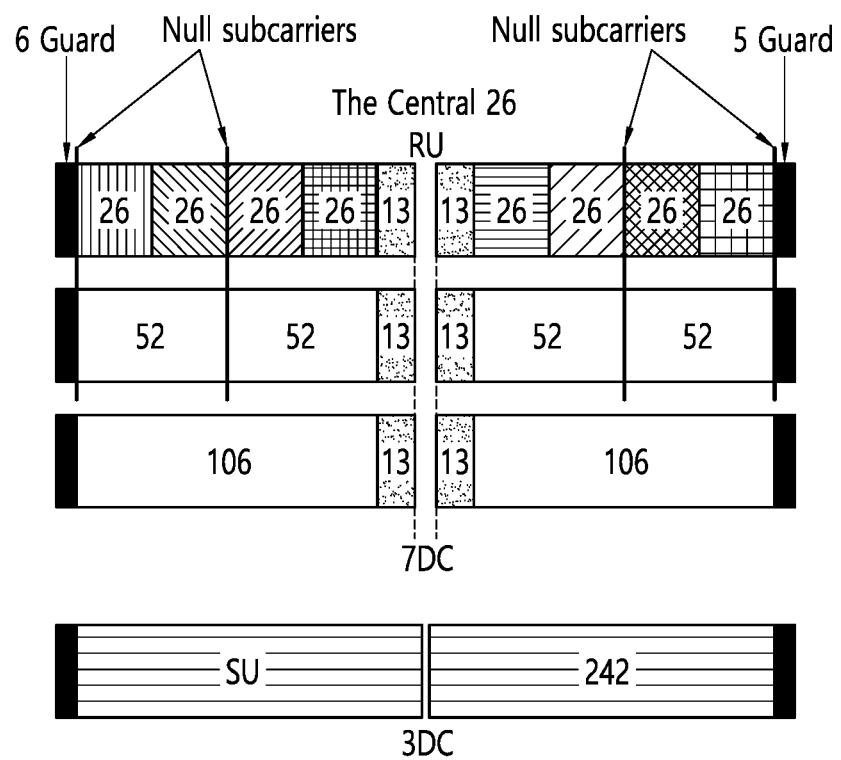
FIG. 4 is a view illustrating an arrangement of a resource unit (RU) used in a 20 MHz band.

FIG. 4 is a view illustrating an arrangement of a resource unit (RU) used in a 20 MHz band.

As illustrated in FIG. 4, resource units (RUs) corresponding to different numbers of tones (i.e., subcarriers) may be used to configure some fields of the HE-PPDU. For example, resources may be allocated in units of RUs shown for the HE-STF, HE-LTF, and data fields.

As shown at the top of FIG. 4, 26 units (i.e., units corresponding to 26 tones) may be arranged. In the leftmost band of the 20 MHz band, 6 tones may be used as a guard band, and in the rightmost band of the 20 MHz band, 5 tones may be used as a guard band. In addition, 7 DC tones may be inserted at the center band, i.e., a DC band, and 26 units corresponding to 13 tones on the left and 13 tones on right sides of the DC band may exist. In addition, 26 units, 52 units, and 106 units may be allocated to other bands. Each unit may be allocated for a receiving station, i.e., a user.

Meanwhile, the RU arrangement of FIG. 4 may be utilized not only in a situation for multiple users (MU) but also in a situation for a single user (SU). In this case, as illustrated at the bottom of FIG. 4, one 242-unit may be used, and in this case, 3 DC tones may be inserted.

In the example of FIG. 4, RUs of various sizes, that is, 26-RU, 52-RU, 106-RU, 242-RU, etc., have been proposed. Since the specific sizes of these RUs may be extended or increased, this embodiment is not limited to the specific sizes of the RUs (i.e., the number of corresponding tones).

Figure 5:
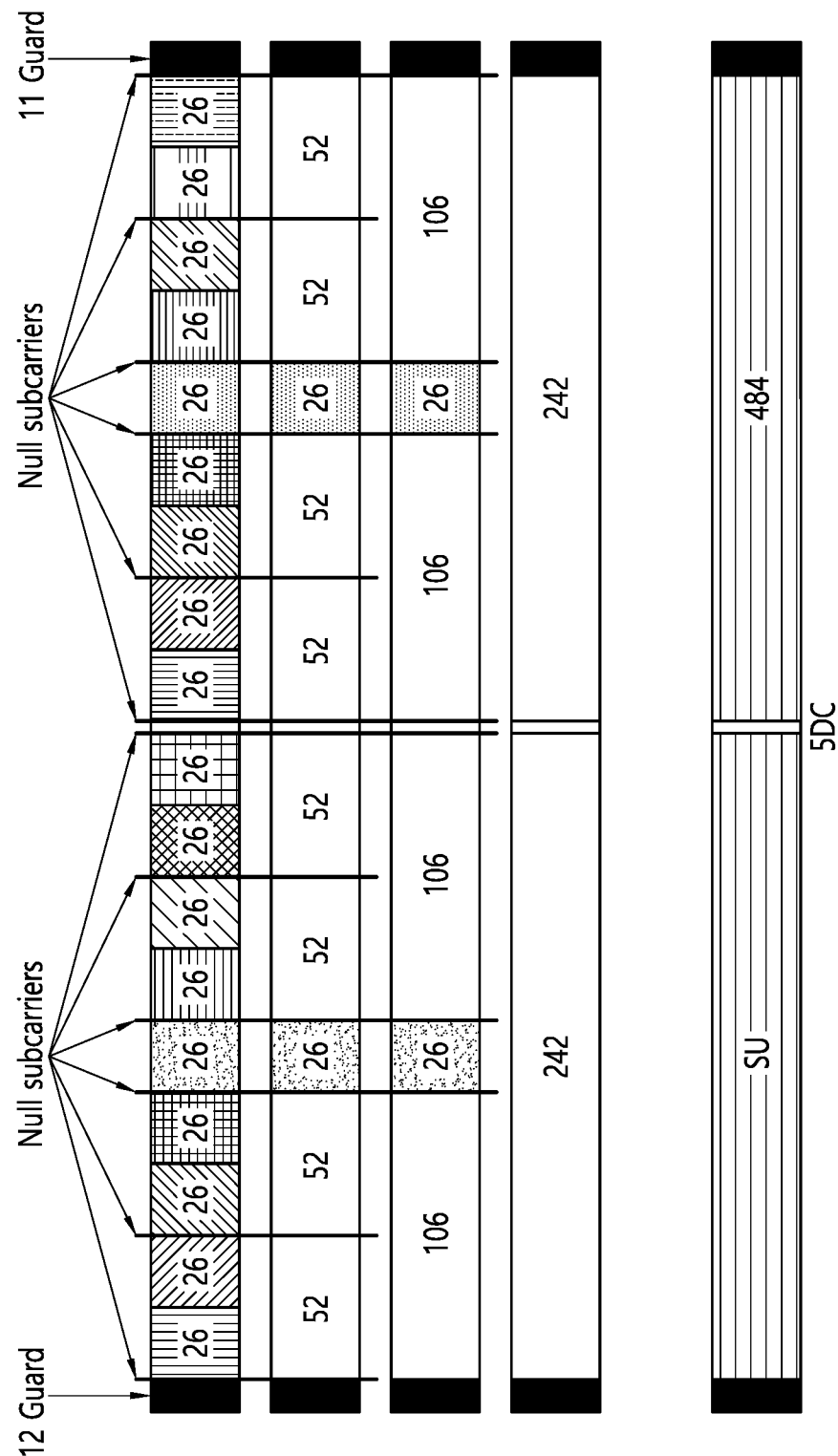
FIG. 5 is a view illustrating an arrangement of a resource unit (RU) used in a 40 MHz band.

FIG. 5 is a view illustrating an arrangement of a resource unit (RU) used in a 40 MHz band.

Similar to the example of FIG. 4 in which RUs of various sizes are used, in the example of FIG. 5, 26-RU, 52-RU, 106-RU, 242-RU, 484-RU, and the like may be used. In addition, 5 DC tones may be inserted into the center frequency, 12 tones may be used as a guard band in the leftmost band of the 40 MHz band, and 11 tones may be used as a guard band in the rightmost band of the 40 MHz band.

Also, as illustrated, when used for a single user, a 484-RU may be used. Meanwhile, the specific numbers of the RUs may be changed as in the example of FIG. 4.

Figure 6:
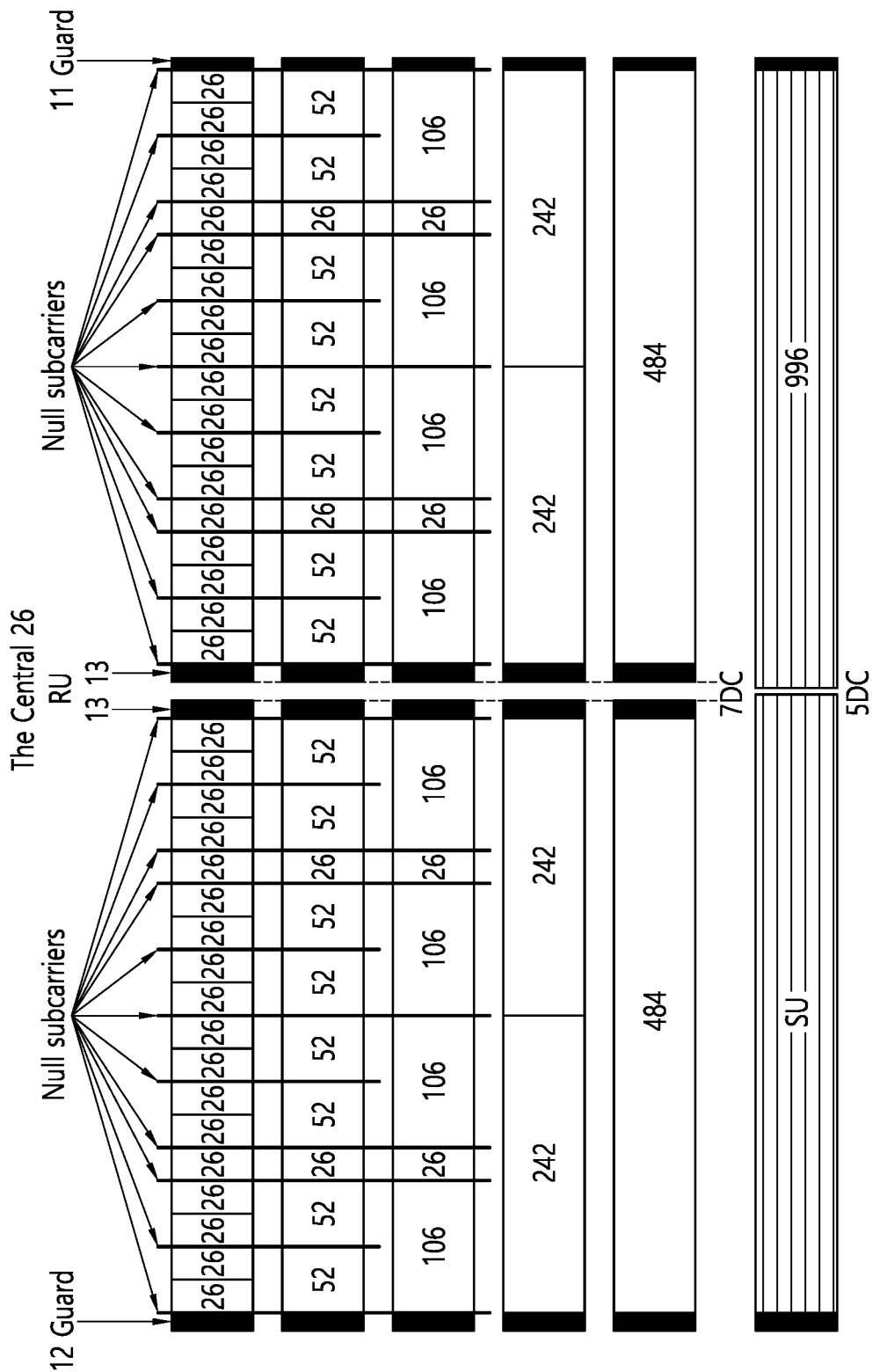
FIG. 6 is a view illustrating an arrangement of a resource unit (RU) used in an 80 MHz band.

FIG. 6 is a view illustrating an arrangement of a resource unit (RU) used in an 80 MHz band.

Like the examples of FIGS. 4 and 5 in which RUs of various sizes are used, in the example of FIG. 6, 26-RU, 52-RU, 106-RU, 242-RU, 484-RU, 996-RU, etc. may be used. In addition, 7 DC tones may be inserted into the center frequency, 12 tones may be used as a guard band in the leftmost band of the 80 MHz band, and 11 tones may be used as a guard band in the rightmost band of the 80 MHz band. In addition, a 26-RU using each 13 tones located on the left and right of the DC band may be used.

Further, as illustrated, when used for a single user, a 996-RU may be used, and in this case, 5 DC tones may be inserted.

Meanwhile, the specific numbers of the RUs may be changed as in the examples of FIGS. 4 and 5.

Figure 7:
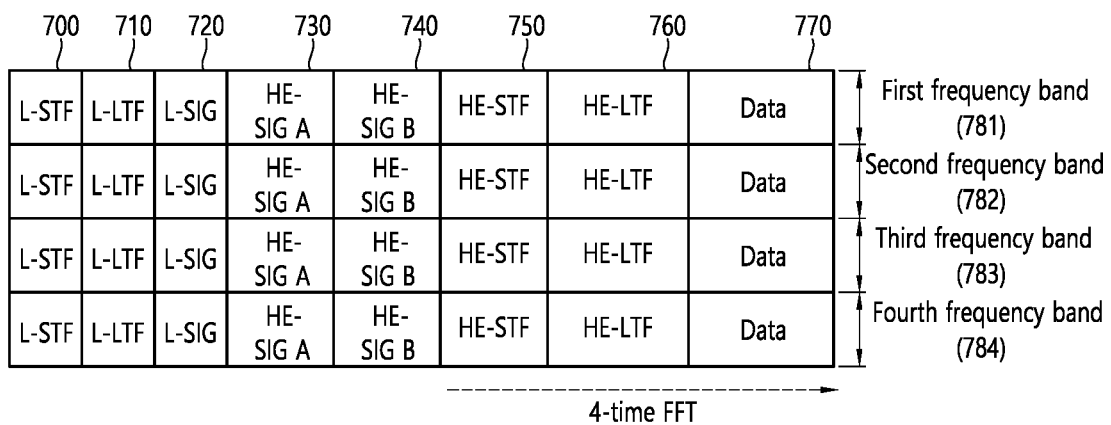
FIG. 7 is a view illustrating another example of an HE-PPDU.

FIG. 7 is a view illustrating another example of an HE-PPDU.

Technical features of the HE-PPDU illustrated in FIG. 7 may also be applied to an EHT-PPDU to be newly proposed. For example, the technical features applied to the HE-SIG may also be applied to an EHT-SIG, and technical features applied to the HE-STF/LTF may also be applied to an EHT-SFT/LTF.

Illustrated L-STF 700 may include a short training orthogonal frequency division multiplexing symbol (OFDM). The L-STF 700 may be used for frame detection, automatic gain control (AGC), diversity detection, and coarse frequency/time synchronization.

L-LTF 710 may include a long training orthogonal frequency division multiplexing (OFDM) symbol. The L-LTF 710 may be used for fine frequency/time synchronization and channel prediction.

L-SIG 720 may be used to transmit control information. The L-SIG 720 may include information related to a data rate and a data length. In addition, the L-SIG 720 may be repeatedly transmitted. That is, the L-SIG 720 may be configured in a repeating format (e.g., it may be referred to as an "R-LSIG").

HE-SIG-A 730 may include control information common to the receiving station.

Specifically, the HE-SIG-A 730 may include information related to 1) a DL/UL indicator, 2) a BSS color field, which is an identifier of a BSS, 3) a field indicating a remaining time of a current TXOP interval, 4) a bandwidth field indicating 20, 40, 80, 160, 80+80 MHz, 5) a field indicating an MCS scheme applied to HE-SIG-B, 6) an indication field regarding whether HE-SIG-B is modulated by a dual subcarrier modulation scheme for MCS, 7) a field indicating the number of symbols used for HE-SIG-B, 8) a field indicating whether the HE-SIG-B is generated over the entire band, 9) a field indicating the number of symbols of HE-LTF, 10) a field indicating a length of the HE-LTF and a length of a CP, 11) a field indicating whether an additional OFDM symbol exists for LDPC coding, 12) a field indicating control information related to packet extension (PE), 13) a field indicating information related to a CRC field of HE-SIG-A, and the like. These specific fields of the HE-SIG-A may be added or some of them may be omitted. In addition, in other environments where HE-SIG-A is not a multi-user (MU) environment, some fields may be added or omitted.

As described above, HE-SIG-B 740 may be included only in the case of a PPDU for multiple users (MU). Basically, HE-SIG-A 750 or HE-SIG-B 760 may include resource allocation information (or virtual resource allocation information) for at least one receiving STA.

HE-STF 750 may be used to improve automatic gain control estimation in a multiple input multiple output (MIMO) environment or an OFDMA environment.

HE-LTF 760 may be used to estimate a channel in a MIMO environment or an OFDMA environment.

A size of FFT (fast Fourier transform)/IFFT (inverse fast Fourier transform) applied to HE-STF 750 and the fields after the HE-STF 750 may be different from a size of FFT/IFFT applied to the fields before the HE-STF 750. For example, the size of the FFT/IFFT applied to the HE-STF 750 and the fields after the HE-STF 750 may be 4 times larger than the size of the IFFT applied to the fields before the HE-STF 750.

For example, when at least one field among the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field related to a legacy system, and the second field may include a field related to an HE system. In this case, the FFT size/IFFT size may be defined as N times (N is a natural number, e.g., N=1, 2, 4) the FFT/IFFT size used in the existing WLAN system. In other words, FFT/IFFT of N(=4) times the first field of the HE PPDU may be applied to the second field of the HE PPDU. For example, 256 FFT/IFFT may be applied for a bandwidth of 20 MHz, 512 FFT/IFFT may be applied for a bandwidth of 40 MHz, 1024 FFT/IFFT may be applied for a bandwidth of 80 MHz, and 2048 FFT/IFFT may be applied for a continuous bandwidth of 160 MHz or discontinuous bandwidth of 160 MHz.

In other words, subcarrier spacing may have a size of 1/N times a subcarrier spacing used in the existing wireless LAN system (N is a natural number, for example, 78.125 kHz in case of N=4). That is, a subcarrier spacing having a size of 312.5 kHz, which is a legacy subcarrier spacing, may be applied to the first field of the HE PPDU, and a subcarrier spacing having a size of 78.125 kHz may be applied for the second field of the HE PPDU.

Alternatively, an IDFT/DFT period applied to each symbol of the first field may be expressed to be N(=4) times shorter than an IDFT/DFT period applied to each data symbol of the second field. That is, the IDFT/DFT length applied to each symbol of the first field of the HE PPDU may be expressed as 3.2 μs, and the IDFT/DFT length applied to each symbol of the second field of the HE PPDU may be expressed as 3.2 μs*4 (=12.8 μs). The length of an OFDM symbol may be a value acquired by adding a length of a guard interval (GI) to the IDFT/DFT length. The length of the GI may be various values such as 0.4 μs, 0.8 μs, 1.6 μs, 2.4 μs, and 3.2 μs.

For convenience of explanation, in FIG. 7, it is illustrated that the frequency band used by the first field and the frequency band used by the second field match exactly, but in reality, they may not completely match each other. For example, the main band of the first field (L-STF, L-LTF, L-SIG, HE-SIG-A, HE-SIG-B) corresponding to the first frequency band is the same as the main band of the second field (HE-STF, HE-LTF, data), but the boundary may not match in each frequency band. This is because it may be difficult to precisely match the boundary as a plurality of null subcarriers, DC tones, guard tones, and the like are inserted in the process of arranging the RUs as illustrated in FIGS. 4 to 6.

The user, i.e., the receiving station, may receive the HE-SIG-A 730 and receive an instruction to receive a downlink PPDU based on the HE-SIG-A 730. In this case, the STA may perform decoding based on the changed FFT size from the HE-STF 750 and the fields after the HE-STF 750. Conversely, if the STA does not receive an instruction to receive a downlink PPDU based on the HE-SIG-A 730, the STA may stop decoding and set a network allocation vector (NAV). A cyclic prefix (CP) of the HE-STF 750 may have a size larger than CPs of other fields, and during the CP period, the STA may perform decoding on the downlink PPDU by changing the FFT size.

Hereinafter, in this embodiment, data (or a frame) transmitted from the AP to the STA may be referred to as downlink data (or downlink frame), and data (or a frame) transmitted from the STA to the AP may be referred to as uplink data (or uplink). Further, transmission from the AP to the STA may be referred to as downlink transmission, and transmission from the STA to the AP may be referred to as uplink transmission.

Figure 8:
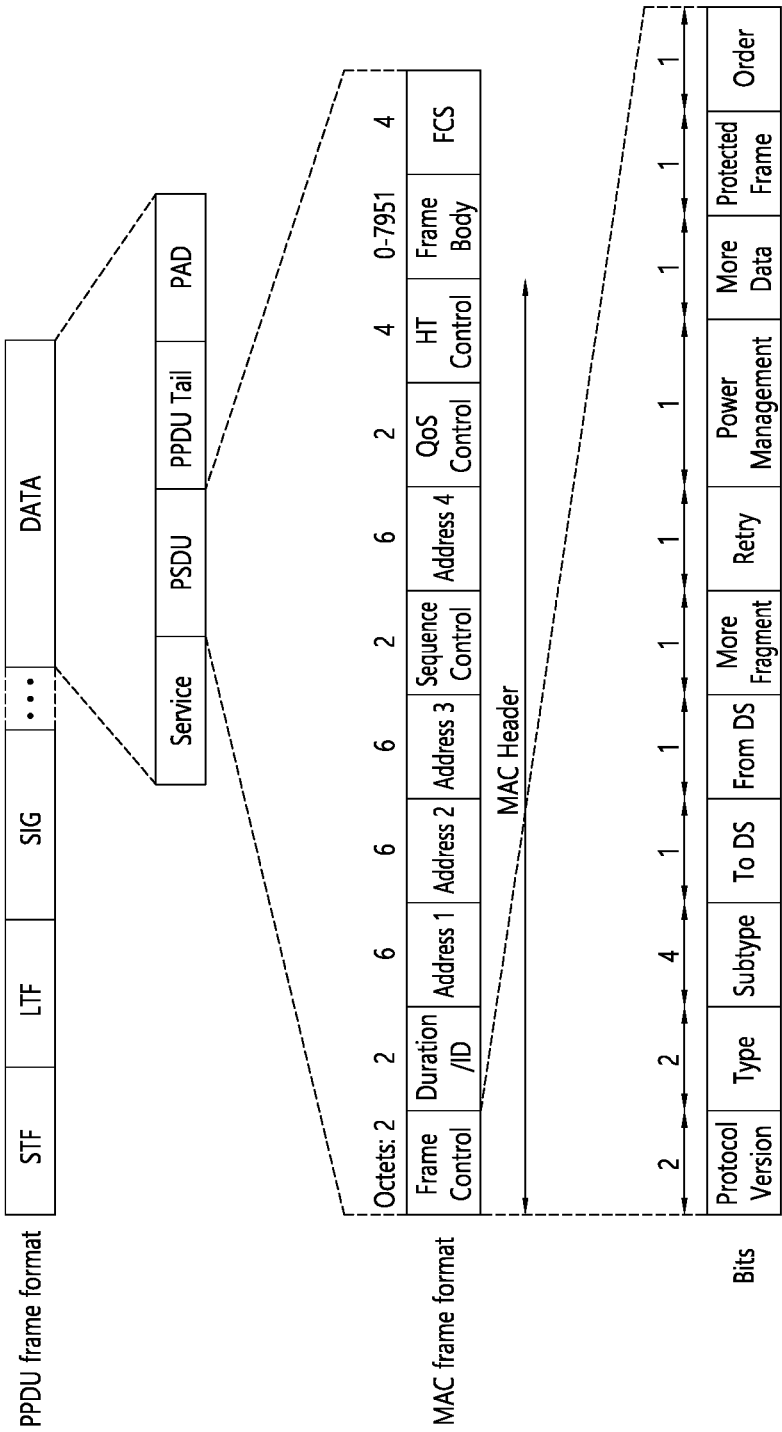
FIG. 8 is a view illustrating an example of a frame structure used in the IEEE 802.11 system.

FIG. 8 is a view illustrating an example of a frame structure used in the IEEE 802.11 system. The STF, LTF, and SIG fields illustrated in FIG. 8 may be the same as or correspond to the (HT/VHT/EHT)-STF, LTF, and SIG fields illustrated in FIG. 3 or 7. In addition, a DATA field illustrated in FIG. 8 may be the same as or correspond to the DATA field illustrated in FIG. 3 or 7.

The data field may include a service field, a physical layer service data unit (PSDU), and a PPDU tail bit. If necessary, the data field may further include a padding bit. Some bits of the service field may be used for synchronization of a descrambler at the receiving end. The PSDU corresponds to a MAC protocol data unit (MPDU) defined in the MAC layer and may include data generated/used in a higher layer. The PPDU tail bit may be used to return an encoder to a zero (0) state. The padding bit may be used to adjust a length of the data field in a predetermined unit.

The MPDU is defined according to various MAC frame formats, and a basic MAC frame includes a MAC header, a frame body, and a frame check sequence (FCS). A MAC frame includes the MPDU and may be transmitted/received through the PSDU of a data part of a PPDU frame format.

The MAC header includes a frame control field, a duration/ID field, an address field, and the like. The frame control field may include control information necessary for frame transmission/reception. The period/ID field may be set as a time for transmitting a corresponding frame or the like.

The period/ID field included in the MAC header may be set to a 16-bit length (e.g., B0 to B15). Contents included in the period/ID field may vary depending on a frame type and subtype, whether it is transmitted during a contention free period (CFP), or QoS capability of the transmitting STA. (i) In a control frame whose subtype is PS-Poll, the period/ID field may include an AID of the transmitting STA and 2 MSB bits may be set to 1 (e.g., through 14 LSB bits). (ii) In frames transmitted during the CFP by a point coordinator (PC) or a non-QoS STA, the period/ID field may be set to a fixed value (e.g., 32768). (iii) In other frames transmitted by the non-QoS STA or control frames transmitted by the QoS STA, the period/ID field may include a duration value defined for each frame type. In a data frame or a management frame transmitted by the QoS STA, the period/ID field may include a duration value defined for each frame type. For example, when B15 of the period/ID field is set to 0 (B15=0), it indicates that the period/ID field is used to indicate the TXOP duration, and B0 to B14 may be used to indicate an actual TXOP duration. The actual TXOP Duration indicated by B0 to B14 may be any one of 0 to 32767 and a unit thereof may be microseconds (us). However, when the duration/ID field indicates a fixed TXOP Duration value (e.g., 32768), B15=1 and B0 to B14=0 may be set. In addition, if B14=1 and B15=1 are set, the period/ID field is used to indicate an AID, and B0 to B13 indicate one AID among 1 to 2007.

The frame control field of the MAC header may include Protocol Version, Type, Subtype, To DS, From DS, More Fragment, Retry, Power Management, More Data, Protected Frame, and Order subfields.

Hereinafter, an auto-detection rule used in the IEEE standard will be described. The transmitting and receiving STA of the WLAN system may simultaneously support PPDUs of various types/formats. In order to identify or detect an intended type/format in the receiving STA, a PPDU set based on a preset rule should be transmitted. Such a rule may be referred to as an auto-detection rule. An example of the preset rule is described with reference to FIGS. 12 to 16.

The PPDU type/format may be determined variously. For example, the type/format of the PPDU may be determined based on non-HT, HT, VHT, HE, and EHT standards.

Figure 9:
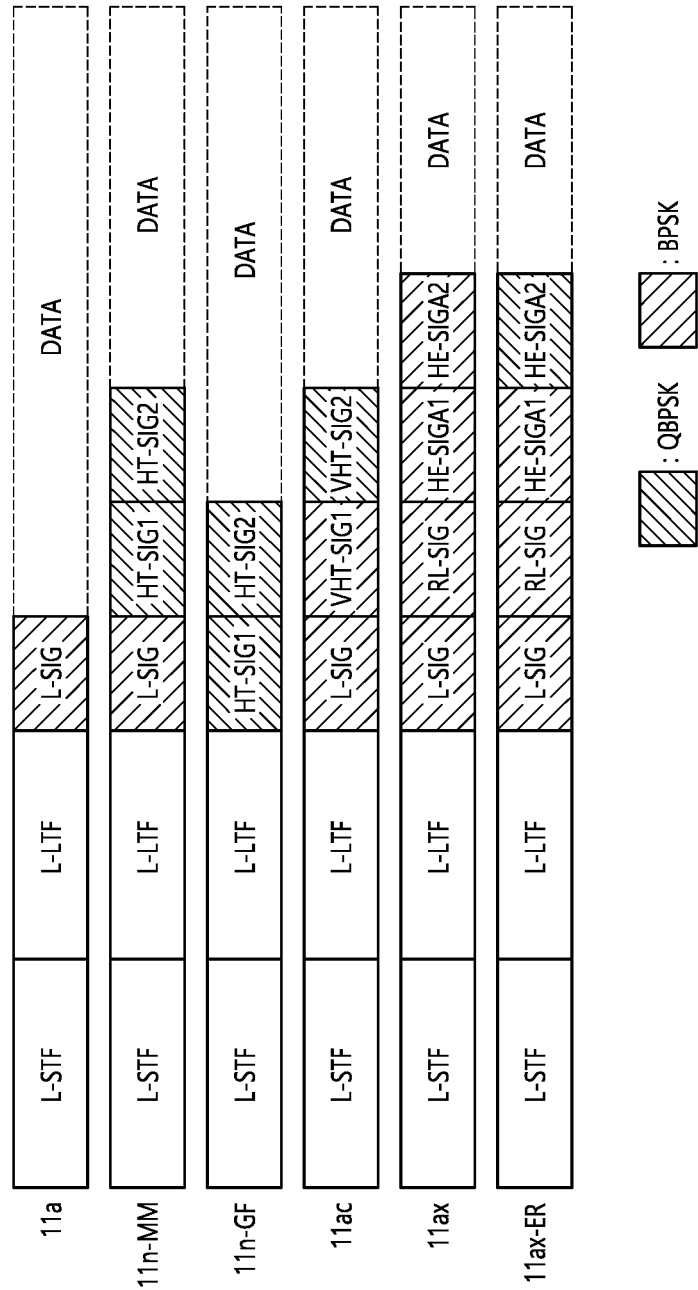
FIG. 9 illustrates an example of various types of PPDUs.

FIG. 9 illustrates an example of various types of PPDUs.

As illustrated in FIG. 9, examples of the type (i.e., format) of the PPDU used in the WLAN system include non-HT, HT, VHT, HE PPDU, and the like. Specifically, a first type PPDU as illustrated is a non-HT PPDU defined in the IEEE 802.11a standard, etc., and a second type PPDU and a third type PPDU as illustrated are an HT PPDU defined in the IEEE 802.11n standard, etc. In addition, a fourth type PPDU as illustrated is a VHT PPDU defined in the IEEE 802.11ac standard, and a fifth type PPDU and a sixth type PPDU as illustrated are HE PPDUs defined in the IEEE 802.11ax standard, etc.

All types of PPDUs and illustrated in FIG. 9 include the L-STF and L-LTF fields. Each of the L-STF and L-LTF fields may be transmitted through two symbols (e.g., OFDM symbols). That is, each of the L-STF and L-LTF fields may have a transmission time of 8 us.

All types of PPDUs 9 and illustrated in FIG. 9 include an L-SIG field or an HT-SIG1 field contiguous to the L-LTF field. The L-SIG field or the HT-SIG1 field illustrated in FIG. 9 may be transmitted through one symbol.

As illustrated in FIG. 9, the HT-SIG1 field of the third type PPDU may be modulated based on a quadrature binary phase shift keying (QBPSK) constellation. The QBPSK constellation may be a constellation rotated by 90 degrees counterclockwise based on a BPSK constellation.

Figure 10:
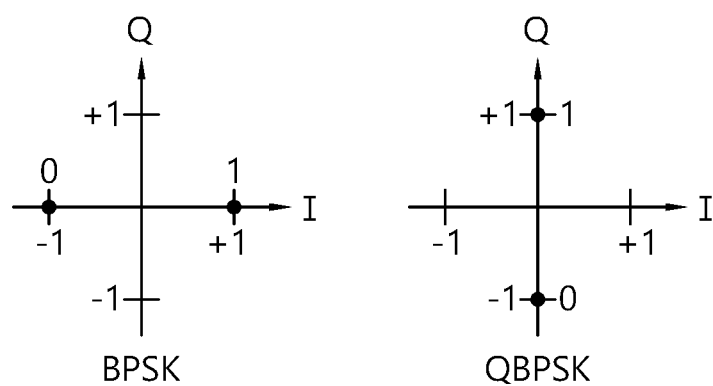
FIG. 10 is a view illustrating BPSK and QBPSK.

FIG. 10 is a view illustrating BPSK and QBPSK. As illustrated, the QBPSK constellation may be a constellation rotated by 90 degrees counterclockwise based on the BPSK constellation.

Since QBPSK is applied to the HT-SIG1 field of a third type PPDU of FIG. 9, the receiving STA may identify that the received PPDU is the third type PPDU when QBPSK is applied to a symbol received after the L-LTF field. In addition, when BPSK is applied to a symbol received after the L-LTF field, the receiving STA may identify that the received PPDU is one of the first, second, fourth, fifth, and sixth type PPDUs. The fifth and sixth type PPDUs may be identified/detected by the receiving STA based on the following example. The fifth and sixth type PPDUs include a repeated L-SIG (RL-SIG) in which L-SIG is repeated as it is in a field contiguous to the L-SIG field. In addition, the fifth and sixth type PPDUs include three symbols after the L-SIG field, and the three symbols include RL-SIG, HE-SIGA1, and HE-SIGA2. The receiving STA may identify/detect that the received PPDUs are the fifth and sixth type PPDUs using the L-SIG repeated as it is in a symbol contiguous to the L-SIG field and the three symbols (i.e., at least one of RL-SIG, HE-SIGA1, and HE-SIGA2) existing after the L-SIG field.

Meanwhile, in the fifth type PPDU, a constellation applied to the third symbol after the L-SIG field is BPSK, and in the sixth type PPDU, a constellation applied to the third symbol after the L-SIG field is QBPSK. Accordingly, the receiving STA may distinguish between the fifth and sixth type PPDUs based on whether the constellation applied to the third symbol after the L-SIG field is BPSK or QPBSK.

In the fourth type PPDU, the L-SIG is not repeated as it is in a field contiguous to the L-SIG field, and BPSK is applied to a first symbol contiguous to the L-SIG and PBPSK is applied to a second symbol contiguous to the first symbol. Accordingly, the receiving STA may identify the fourth type PPDU based on (whether the L-SIG field is repeated and/or) whether QBPSK is applied to the second symbol.

In addition, in the second type PPDU, since QBPSK is applied to two symbols contiguous to the L-SIG, the receiving STA may identify/detect the second type PPDU from other types of PPDUs. In addition, since all of second to sixth type PPDUs have distinguishable characteristics as described above, if a PPDU which is not identified/detected as the second to sixth PPDUs may be identified/detected as a first type PPDU.

The specific order of the identification/detection method described above may be changed. That is, when the number/constellation of the symbols after the L-LTF is uniquely configured as illustrated in FIG. 9, the receiving STA may accurately identify a type of the received PPDU through various methods.

Hereinafter, the present disclosure proposes an example for identifying/detecting a new type of PPDU. The new type of PPDU proposed in this disclosure may be an EHT PPDU. In addition, the new type of PPDU proposed in this disclosure may be a PPDU in accordance with the IEEE 802.11be standard. The EHT PPDU and/or the PPDU in accordance with the IEEE 802.11be standard may support the technical features described below.

Since the following example relates to an example of identifying/detecting various types of PPDUs, the following technical features are not limited to the term EHT. In other words, the term EHT may be changed/omitted, and a PPDU identified/detected by the following example may be referred to as various terms such as a new type PPDU, a first type PPDU, etc. For example, the following technical features may be applied to the EHT standard or to a new WLAN standard which enhances IEEE 802.11.

For convenience of description, related technical features will be described based on the EHT PPDU.

A wide bandwidth (e.g., a maximum of 320 MHz) may be supported for the EHT PPDU (/or the PPDU in accordance with the IEEE 802.11be standard) so that a higher data rate than the existing standard may be supported. In addition, an STA (i.e., an EHT STA) that transmits/receives the EHT PPDU may support up to 16 streams. In addition, the EHT STA may transmit/receive the EHT PPDU on various frequency channels/bands. That is, the EHT STA may support a multi-band operation. The EHT PPDU may be transmitted and received in various bands, for example, in a 2.4 GHz/5 GHz/6 GHz band.

In addition, the EHT PPDU may be used together with various legacy PPDUs illustrated in FIG. 9. In order for the EHT PPDU to be mixed with the legacy type of PPDU, the receiving STA should be able to easily identify/detect the type of the EHT PPDU. The following example proposes an example of a PPDU for easily identifying/detecting an EHT PPDU.

The technical features of identifying/detecting the EHT PPDU by the receiving STA may have the following technical effects. As described above, the EHT PPDU may be transmitted/received through various bands such as 2.4 GHz/5 GHz/6 GHz. That is, the EHT PPDU may be used together with other types of PPDUs in accordance with the IEEE 802.11n/11ac/11ax standards. In this case, when an STA that does not support the EHT PPDU performs decoding on the EHT PPDU, a problem of wasting reception power may arise. In other words, when a received PPDU is easily identified as an EHT PPDU, operation power may be saved. The following example proposes a reception operation and a transmission operation for efficiently identifying/detecting the EHT PPDU, thereby optimizing power consumption of an STA and achieving a technical effect of preventing a malfunction of the STA.

Figure 11:
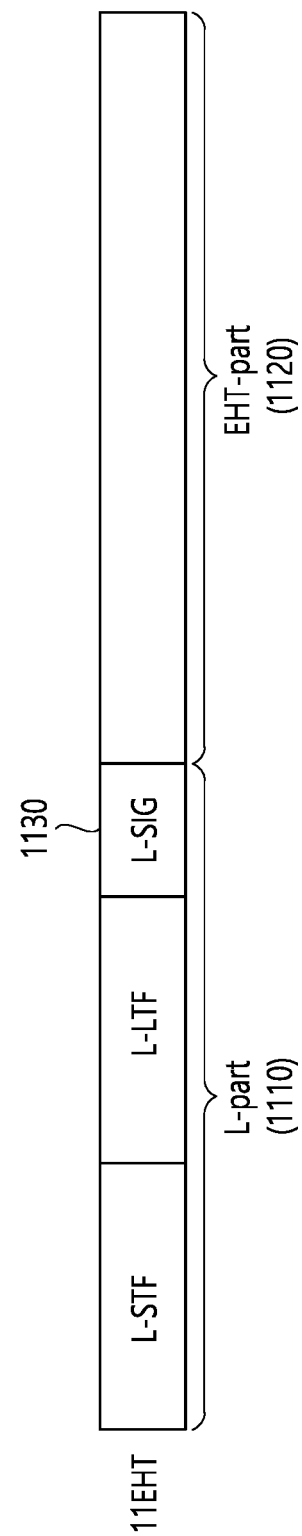
FIG. 11 illustrates an example of an EHT PPDU applicable to the present disclosure.

FIG. 11 illustrates an example of an EHT PPDU that may be applied to the present disclosure. A PPDU illustrated in FIG. 11 may include a legacy part 1110 (or L-part) and a newly proposed EHT Part 1120 for supporting coexistence/sub-compatibility with a legacy PPDU. Some of the illustrated fields may be omitted or the order of the fields may be changed.

Each field of the PPDU illustrated in FIG. 11 may be transmitted through at least one symbol (i.e., OFDM symbol). A time length of the OFDM symbol may be variously determined and may be determined as an integer multiple of 4 us, for example. The legacy part 1110 may include at least one of non-HT short training field (L-STF), non-HT long training field (L-LTF), a non-HT signal field (L-SIG) 1130. The legacy part 1110 may be transmitted before the EHT part 1120 to support coexistence/sub-compatibility with the legacy PPDU. According to an embodiment, the EHT-part 1120 may include an RL-SIG field, an EHT control field, or an EHT data field similar to the PPDU configuration of 802.11ax. Some components (or fields) of the EHT-part 1120 may be omitted, added, or changed depending on whether a multi-user is supported.

According to an embodiment, the EHT PPDU 1120 may not include the RL-SIG field. That is, the EHT PPDU 1120 may not include an RL-SIG field in which the L-SIG 1130 is repeated. For example, the EHT PPDU 1120 may include one field (or symbol) through which the receiving STA may easily identify/detect the type of the EHT PPDU 1120. A specific example of one field (or symbol) enabling easily identifying/detecting the type of the EHT PPDU 1120 in place of the RL-SIG field or together with the RL-SIG field will be described below.

The PPDU used in the present disclosure may include a legacy signal field and a control signal field and a data field contiguous to the legacy signal field. Specific technical features of the PPDU may be embodied as an example of FIGS. 12 to 15.

Figure 12:
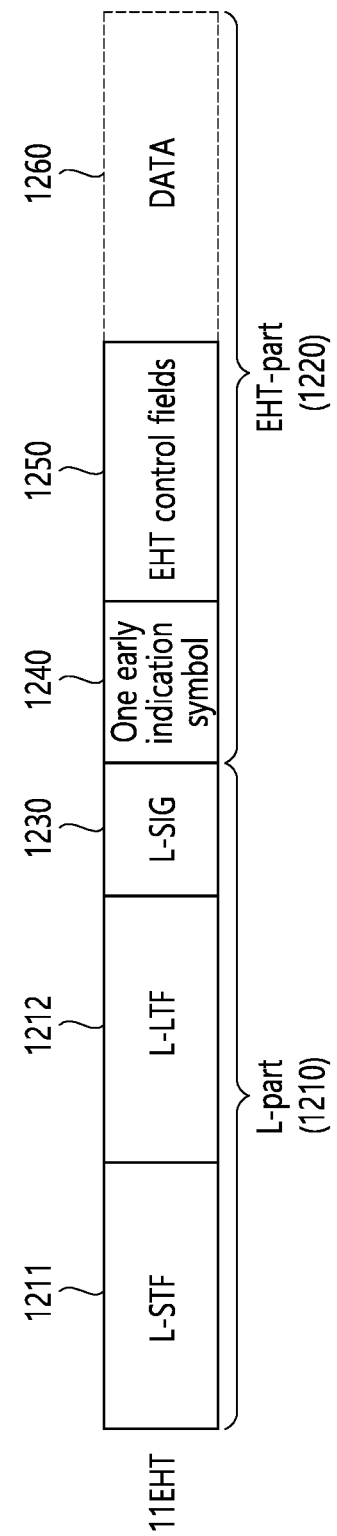
FIG. 12 illustrates another example of an EHT PPDU applicable to the present disclosure.

FIG. 12 illustrates another example of an EHT PPDU applicable to the present disclosure.

As described above, the PPDU of the present disclosure may include a legacy signal field and a continuous control signal field. The legacy signal field may be generated based on a first signal bit, and the control signal field may be generated based on a second signal bit.

A specific example of the legacy signal field may be L-SIG 1230 of FIG. 12. A specific example of the control signal field may be One_early_indication_symbol 1240 of FIG. 12. One_early_indication_symbol 1240 may be referred to as various names such as One_early_indication field, Early_indication field, Early_indication symbol, and the like. A specific example of the first signal bit may include conventional 24-bit control information used for the L-SIG 1230 of FIG. 12. In addition, a specific example of the second signal bit may include 26-bit control information described in the following example. L-STF 1211 and L-LTF 1212 of FIG. 12 may be configured to be the same as the legacy L-STF and L-LTF. The L-SIG 1230 may be transmitted (or received) using legacy neurology.

According to an embodiment, the One_early_indication_symbol 1240 and the EHT control field 1250 may be transmitted (or received) based on MCSO according to the related art. For example, the transmitting STA may perform binary convolutional code (BCC) encoding on the first/second signal bits at a 1/2 code rate. Also, the transmitting STA may perform BPSK modulation on the encoded bit information.

For example, the EHT PPDU may be received through a 5 GHz band, and the corresponding 5 GHz band region may also be used for transmission of HT PPDU, VHT PPDU, and HE PPDU. Accordingly, it is preferable that the configuration of the EHT-PPDU is determined to be distinguished from other types of PPDUs. In the example of FIG. 12, the receiving STA may identify that a received signal is an EHT-PPDU through the One_early_indication_symbol 1240.

For example, as illustrated in FIG. 9, the HT STA may measure a constellation of two symbols contiguous to the L-SIG, and when the constellations of the two symbols are both QBPSK, the HT STA may determine that the received PPDU is an HT type. In a case where the BPSK symbol 1240 is consecutively included after the L-SIG 1230 as shown in FIG. 12, the HT STA may determine that the received PPDU is not the HT type, when reviewing the constellations of the two symbols 1230 and 1240 contiguous to the L-SIG. That is, the HT STA may reduce an error of recognizing another type of PPDU by identifying the HT PPDU based on the constellations of the two symbols 1230 and 1240.

For example, as illustrated in FIG. 9, the VHT STA may measure the constellations of two symbols contiguous to the L-SIG, and when the constellations of the corresponding two symbols are QBPSK after BPSK, the VHT STA may determine that the received PPDU is a VHT type. In a case where the BPSK symbol 1240 is consecutively included after the L-SIG 1230 as shown in FIG. 12, the VHT STA may determine that the received PPDU is not the VHT type, when reviewing the constellations of the two symbols 1230 and 1240 contiguous to the L-SIG. That is, the VHT STA may reduce an error of recognizing a different type of PPDU by identifying the VHT PPDU based on the constellations of the two symbols 1230 and 1240.

Additionally, the HE STA may determine whether the L-SIG is repeated in a symbol contiguous to the L-SIG. That is, the HE STA may determine whether there is an RL-SIG contiguous to the L-SIG. Accordingly, when the repeated L-SIG exists after the L-SIG, the HE STA may determine that the received PPDU is an HE type. In the example of FIG. 12, since the One_early_indication_symbol 1240 is received after the L-SIG, the HE STA may determine that the RL-SIG does not exist. That is, since there will be a Euclidean distance between content included in the One_early_indication_symbol 1240 and content of the L-SIG 1240, the HE STA may determine that the L-SIG of the PPDU of FIG. 12 is not repeated. This may solve the problem of false detection for a received PPDU.

Figure 13:
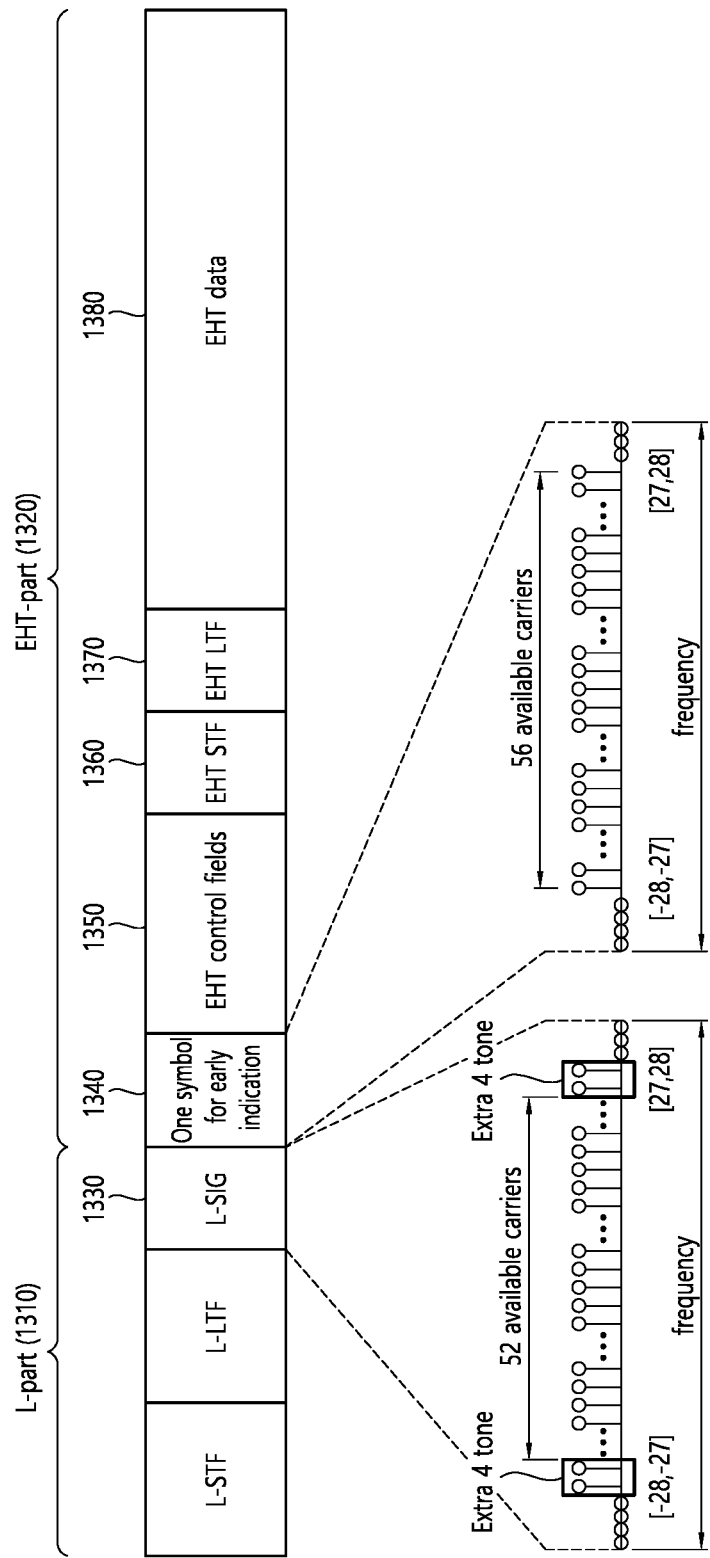
FIG. 13 illustrates another example of an EHT PPDU applicable to the present disclosure.

FIG. 13 illustrates another example of an EHT PPDU applicable to the present disclosure.

As described above, the PPDU of the present disclosure may include the legacy signal field and the control signal field consecutive thereto. In addition, the legacy signal field may be generated based on a first signal bit, and the control signal field may be generated based on a second signal bit. The legacy signal field and the control signal field may be generated based on BPSK.

A specific example of the legacy signal field may be L-SIG 1330 of FIG. 13. A specific example of the control signal field may be One_early_indication_symbol 1340 of FIG. 13. An example of the first signal bit may be conventional 24-bit information for the L-SIG 1330 of FIG. 13. An example of the second signal bit may be 26-bit information described below.

Specifically, the PPDU of FIG. 13 may include a legacy part (or L-part) 1310 and One_early_indication_symbol, an EHT control field 1350, an EHT-STF 1360, an EHT-LTF 1370, and a data field 1380 contiguous to the legacy part 1340. An EHT part 1320 may include the EHT control field 1350, the EHT-STF 1360, the EHT-LTF 1370, and the data field 1380.

To generate the L-SIG 1330 of FIG. 13, the transmitting STA may perform binary convolutional code (BCC) encoding on 24-bit information at a 1/2 code rate and perform BPSK modulation on the encoded 48-bit information. The transmitting STA may generate the L-SIG 1330 by allocating the generated 48 BPSK symbols to remaining frequency tones, excluding a DC tone and pilot tones (−21, −7, +7, +21 indexes). That is, each subcarrier index of the L-SIG 1330 may be arranged in a frequency domain at a subcarrier spacing interval of 312.5 kHz, and the L-SIG 1330 generated by the transmitting STA may be transmitted through the frequency domain corresponding from the index −26 to index +26.

In addition, in order to increase bit information of the One_early_indication_symbol (1340) for the EHT STA, the transmitting STA may configure the L-SIG 1330 by adding four extra tones (−28, −27, +27, +28 indexes). Four extra tones added to the L-SIG 1330 may be used for channel estimation so that four tones may be further used in the One_early_indication_symbol 1340 transmitted after the L-SIG 1230. As a result, for the One_early_indication_symbol (1340) and subsequent signals, a total of 56 tones (i.e., −28 index to +28 index tones) excluding the DC tone may be used.

According to an embodiment, the control signal field, i.e., One_early_indication_symbol 1340, may include 26-bit information described below. MCSO may be applied to One_early_indication_symbol 1340. For example, the transmitting STA may perform BCC encoding on 26-bit information described below at a 1/2 code rate. Also, the transmitting STA may perform BPSK modulation on 52-bit information encoded by the BCC scheme. The transmitting STA may transmit the One_early_indication_symbol 1340 in a manner of allocating the generated 52 BPSK symbols to the remaining frequency tones excluding the DC tone and the pilot tones (−21, −7, +7, +21 indexes). Further, the transmitting STA may apply MCSO to the EHT control field 1350 as well.

Hereinafter, an example of 26-bit information transmitted through a second signal bit, for example, One_early_indication_symbol 1340, will be described. For convenience of description below, the second signal bit is described as 26 bits, but the specific bit length may be changed. The following technical features 1 to 3 may be applied to the second signal bit (e.g., 26 bits).

Feature 1:

As described above, the 1/2 code rate BCC coding may be applied to the second signal bit (e.g., 26 bits), and BSPK modulation may be applied to the coded bit.

Feature 2:

As illustrated, One_early_indication_symbol 1340 may be transmitted in 1 symbol (i.e., an OFDM symbol in 4 us length), and BCC coding may be applied. When conventional BCC coding is applied, a tail bit for the receiving STA may be required. Specifically, n-bit (e.g., 6-bit) information for terminating the trellis of a convolutional decoder in the receiving STA may be transmitted through the One_early_indication_symbol 1340. That is, the second signal bit (e.g., 26 bits) may include n bits (e.g., 6 bits) of the tail bit.

In addition, a cyclic redundancy check (CRC) bit for proper decoding of the receiving STA may be included in the second signal bit (e.g., 26 bits). For example, the CRC bit included in the second signal bit (e.g., 26 bits) may be a 4-bit CRC bit included in the legacy SIG-A field (e.g., HE-SIG-A). The second signal bit (e.g., 26 bits) may include a parity bit of 1 bit instead of the CRC bit. When the parity bit is included instead of the CRC bit, there is an advantage that additional information may be included in the second signal bit (e.g., 26 bits).

Feature 3:

A candidate field that may be included in the second signal bit (e.g., 26 bits) through features 3-A to 3-E is proposed below. For example, when the tail bit is 6 bits and the CRC bit is 4 bits, the total length of the candidate field below may be 14 bits, and when the parity bit of 1 bit is included instead of the CRC bit, the total length of the candidate field below may be 17 bits. Some of the features 3-A to 3-E described below may be omitted or modified, and individual bit lengths may be modified.

Feature 3-A:

The second signal bit may include a BSS color field (i.e., a BSS color inform field). The BSS color inform field may include information related to a BSS color (i.e., BSS color ID) of a received packet (or received PPDU). The receiving STA may first determine whether information comes from a BSS of the receiving STA through the BSS color inform field. The receiving STA may determine whether a transmitted packet is an inter-BSS packet or an overlapping BSS (OBSS) packet (i.e., an intra-BSS packet) through the BSS color inform field. The BSS color inform field may consist of 6 to 11 bits. The BSS color inform field may be transmitted earlier than other fields. The receiving STA may first determine the OBSS based on the BSS color inform field. The receiving STA may reduce power consumption of the receiving STA by identifying the BSS color inform field earlier than other fields (e.g., data field or other control fields). For example, the receiving STA may determine whether to perform decoding on a signal after the One_early_indication_symbol 1340 based on the BSS color inform field. Through this, the receiving STA may reduce power consumption.

Feature 3-B:

The second signal bit may include a packet indication/frame format indication field. The packet indication/frame format indication field may consist of 1 to 2 bits. The packet indication/frame format indication field may include information related to a type of a transmitted packet (or PPDU).

For example, when the packet indication/frame format indication field is 1 bit, it may indicate whether a packet is an EHT packet according to the field value.

For example, when the packet indication/frame format indication field is 2 bits, information according to the field value may be defined as shown in Table 1. The specific values indicated in Table 1 may be changed.

TABLE 1

| Value | Description |
| --- | --- |
| 00 | EHT packet |
| 01 | Reserved for future device |
| 10 | Reserved for future device |
| 11 | Reserved for future device |

The packet indication/frame format indication field may indicate not only the type of a packet but also information related to a frame format. Alternatively, the packet indication/frame format indication field may include only information related to the type of a packet or only information related to a frame format.

For example, when the packet indication/frame format indication field is 2 bits, information according to the field value may be defined as shown in Table 2. The specific values indicated in Table 2 may be changed.

TABLE 2

| Value | Description |
| --- | --- |
| 00 | Not EHT packet (PPDU) |
| 01 | SU PPDU |
| 10 | MU PPDU |
| 11 | Trigger based PPDU |

The packet indication/frame format indication field described above may be additionally modified. For example, the packet indication/frame format indication field may have a length of 3 or 4 bits. For example, the 3 or 4-bit information may include packet related information and information related to a frame format. Specifically, a specific bit (e.g., first 1 bit or first 2 bits) of 3 or 4-bit information may include information related to a packet (e.g., information related to whether a transmission/reception packet is an EHT PPDU and/or a new standard PPDU), and other bits (e.g., the last two bits) may include information related to a frame format (e.g., the example in Table 2 or the example modified from example of Table 2).

Feature 3-C:

The second signal bit may include a TXOP field. The TXOP field may include information related to a transmission opportunity. Specifically, the TXOP field may include information related to a TXOP length. The transmitting STA may transmit information related to the TXOP for protection of a currently transmitted PPDU (or packet). The transmitting STA may reduce an influence of interference and channel access to third party devices through the TXOP field. That is, an unintended STA may set a network allocation vector (NAV) based on the TXOP field according to feature 3-C.

Feature 3-D:

The second signal bit may include an STA ID/RX ID field. The STA ID/RX ID field may indicate an ID of the transmitting STA or an ID of the receiving STA. The STA ID may be configured as a partial STA-ID. The receiving STA may determine whether a received frame is a frame transmitted to itself based on the STA ID/RX ID field. That is, the STA ID or RX ID may include an identifier of the receiving STA. The receiving STA may reduce power consumption of the receiving STA by identifying the STA ID/RX ID field earlier than other fields (e.g., data field or other control fields). For example, the receiving STA may determine whether to perform decoding on a signal after the One_early_indication_symbol 1340 based on the STA ID/RX ID field. Through this, the receiving STA may reduce power consumption.

Feature 3-E:

The second signal bit may include a bandwidth (BW) field. The BW field may include information related to a bandwidth of the PPDU. A wide bandwidth (e.g., up to 320 MHz) may be supported in the EHT PPDU so that a higher data rate than the existing standard may be supported. That is, more bits may be required to indicate the BW of the transmission/reception PPDU. Accordingly, the transmitting STA may use the BW field to reduce signaling overhead of the SIG field (e.g., a signal field transmitted after One_early_indication_symbol) for indicating the bandwidth.

For example, the BW field may include information related to whether a transmission bandwidth is 160 MHz or higher. When the transmission bandwidth is 80 MHz or lower, the BW field value may be set to a first value (e.g., 0). When the transmission bandwidth is 160 MHz or higher, the BW field may include information related to the bandwidth of the PPDU. That is, the BW field may include information related to a specific size of a bandwidth when the bandwidth of the PPDU is 160 MHz or higher, and may include only information indicating that the bandwidth of the PPDU is not higher than 160 MHz when the bandwidth of the PPDU is lower than 160 MHz.

In the above example, the BW field is configured based on 160 MHz, but a specific size of a bandwidth may be variously changed. That is, the BW field may indicate whether the bandwidth is 240 MHz or 320 MHz or higher.

Additionally or alternatively, the transmitting STA may hierarchically transmit information related to a transmission bandwidth using the BW field and the SIG field (e.g., a bandwidth indication field in the SIG field). For example, the BW field may include only information related to whether the bandwidth of the PPDU is higher than (or exceeds) a specific bandwidth (e.g., 160 MHz), and information related to the bandwidth of the specific PPDU may be included in a signal (e.g., EHT-SIG-A) after One_early_indication_symbol 1340.

Figure 14:
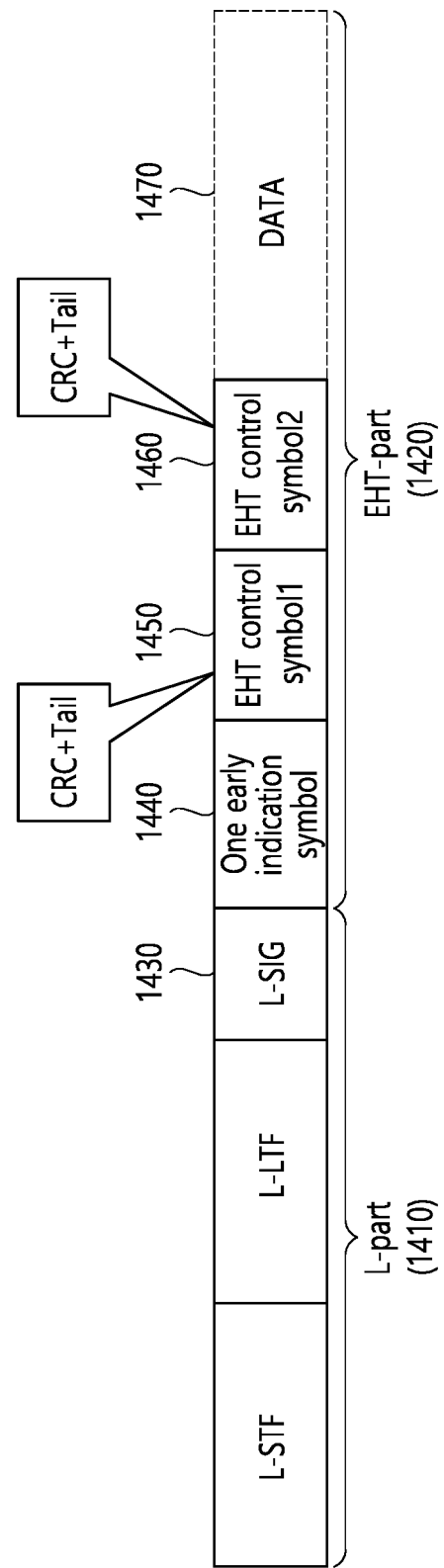
FIG. 14 illustrates another example of an EHT PPDU applicable to the present disclosure.

FIG. 14 illustrates another example of an EHT PPDU applicable to the present disclosure.

As described above, the PPDU of the present disclosure may include a legacy signal field and a control signal field contiguous to the legacy signal field, a first EHT control field (or a first EHT signal field) contiguous to the control signal field, and a second EHT control field contiguous to the first EHT control field (or the first EHT signal field). In addition, the legacy signal field may be generated based on a first signal bit. The control signal field may be generated based on a second signal bit. The first EHT control field may be generated based on a third signal bit. The second EHT control field may be generated based on a fourth signal bit.

A specific example of the legacy field may be the L-SIG 1430 of FIG. 14. A specific example of the control signal field may be One_early_indication_symbol 1440. A specific example of the first EHT control field may be EHT control symbol1 1450. A specific example of the second EHT control field may be EHT control symbol2 1460. An example of the first signal bit may be conventional 24-bit information for the L-SIG 1430 of FIG. 14. An example of the second signal bit, the third signal bit, and the fourth signal bit may each be 26 bits of information. An example of FIG. 14 is an example specifying the example of FIG. 12 and/or FIG. 13. That is, technical features of FIG. 14 include all or part of the technical features of the example of FIG. 12 or 13. For example, the L-SIG 1430 and One_early_indication_symbol 1440 of FIG. 14 may be the same as the L-SIG and One_early_indication_symbol of FIG. 12 or 13.

In addition, in the example of FIG. 14, like the example of FIG. 13, 4 extra tones may be used for L-SIG, and 56 tones may be used for One_early_indication_symbol and subsequent signals. Accordingly, each of the EHT control symbol1 1450 and the EHT control symbol2 1460 may include 26 information bits like the legacy SIG-A field (e.g., HE-SIG-A1 or HE-SIG-A2). In addition, 1/2 code rate BCC coding may be applied to 26 information bits, and BPSK modulation may be applied to coded bits.

In the example of FIG. 14, a CRC bit and a tail bit may be included in each of the EHT control symbol1 1450 and the EHT control symbol2 1460. When One_early_indication_symbol 1240, 1340, or 1440 according to an example of the present disclosure is used, an additional bit may be included in a control/signal field transmitted later, compared to the related art. That is, some of the bits to be included in EHT control symbol1 1450 and EHT control symbol2 1460 may be included in One_early_indication_symbol 1240, 1340, or 1440, so additional bits may be included in EHT control symbol1 1450 and EHT control symbol2 1460. Accordingly, a CRC bit and a tail bit may be included in each of the EHT control symbol1 1450 and the EHT control symbol2 1460. In the related art, when the SIG field is transmitted through several symbols, the CRC bit and the tail bit are included in only one symbol. Accordingly, the receiving STA cannot decode the information bits included in the SIG field until all the symbols transmitting the SIG field are received. In contrast, in the case of the example of FIG. 14, since the CRC bit and a tail bit are included in each symbol 1450 and 1460, a more efficient decoding operation may be supported.

The example of FIG. 14 may be further modified. For example, the EHT control symbol1 1450 and the EHT control symbol2 1460 may each include a parity bit of 1 bit and a tail bit, and the CRC bit may be omitted.

Figure 15:
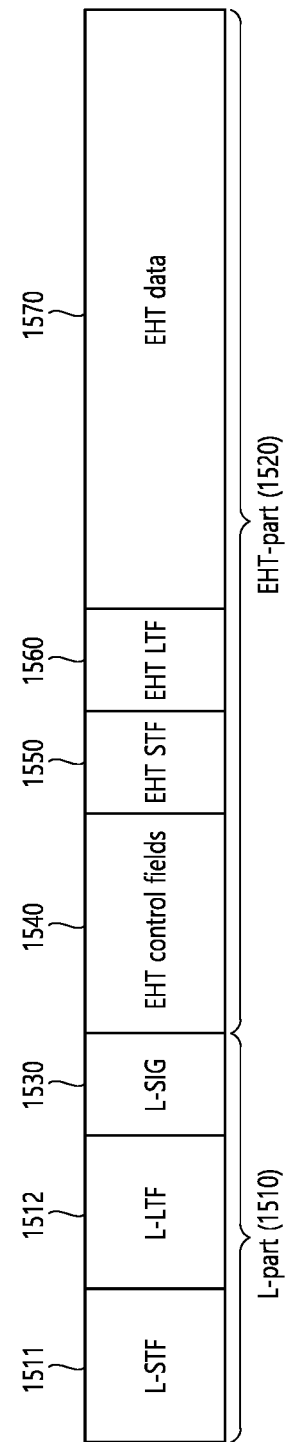
FIG. 15 illustrates another example of an EHT PPDU applicable to the present disclosure.

FIG. 15 illustrates another example of an EHT PPDU applicable to the present disclosure. The example of FIG. 15 is an example modified from the example of FIGS. 12 to 14.

An example of FIG. 15 may include a legacy signal field and an EHT control field (or EHT signal field) contiguous to the legacy signal field. In addition, the legacy signal field may be generated based on a first signal bit. The EHT control field may be generated based on a second signal bit per symbol.

In the PPDU of FIG. 15, the aforementioned One_early_indication_symbol 1240, 1340, or 1440 may be omitted. Instead, in the example of FIG. 15, information for decoding the EHT PPDU may be included in the EHT control field (or EHT signal field) contiguous to the legacy signal field. That is, the information bits of "Feature 1" to "Feature 3" applied to the aforementioned One_early_indication_symbol 1240, 1340, or 1440 may be included in at least one EHT control field (or EHT signal field). For example, in the example of FIG. 15, at least one EHT control field (or EHT signal field) may include the packet indication/frame format indication field described through feature 3-B. In other words, the information related to a packet (e.g., information related to whether a transmission/reception packet is an EHT PPDU) and/or information related to a frame format (e.g., example of Table 2 or example modified from the example of Table 2) may be included through at least one EHT control field (or EHT signal field).

A specific example of the legacy field may be L-SIG 1530 of FIG. 15. The EHT control field may be at least one EHT control field 1540 illustrated in FIG. 15. An example of the first signal bit may be conventional 24-bit information for the L-SIG 1530 of FIG. 15. An example of the second signal bit may be 26-bit information.

Specifically, the PPDU of FIG. 15 may include a legacy part (or L-part) 1510 and an EHT part 1520. The legacy part 1510 may include an L-STF 1511, an L-LTF 1512, or an L-SIG 1530. The EHT Part 1520 may include an EHT control field 1540, an EHT-STF 1550, an EHT-LTF 1560, or a data field 1570. The PPDU illustrated in FIG. 15 may not include the One_early_indication_symbol 1440 illustrated in FIG. 13. In the PPDU illustrated in FIG. 15, the EHT control field 1540 may be configured after the L-SIG 1530.

In the example of FIG. 13, four extra tones (−28, −27, +27, 28) used for the purpose of channel estimation, etc. may be used as it is in the L-SIG 1530 of FIG. 15 or may be omitted. For example, when four extra tones are not used, the EHT control field 1540 may be configured based on legacy neurology (e.g., non-HT neurology). Meanwhile, when four extra tones are used, the EHT control field 1540 may be configured based on the conventional standard neurology such as IEEE 802.11ac.

According to an embodiment, like the example of FIG. 14, the EHT control field 1540 of FIG. 15 may be configured in units of one symbol. Also, like the example of FIG. 14, the EHT control field 1540 of FIG. 15 may include a plurality of symbols. The plurality of symbols included in the EHT control field 1540 may each include a CRC bit and a tail bit. The plurality of symbols included in the EHT control field 1540 may include a parity bit instead of the CRC bit.

According to an embodiment, the EHT control field 1540 may include a plurality of symbols (i.e., OFDM symbols). In this case, only one of the plurality of symbols for transmitting the EHT control field 1540 may include a CRC bit and a tail bit. Also, the EHT control field 1540 may include a parity bit instead of the CRC bit.

Figure 16:
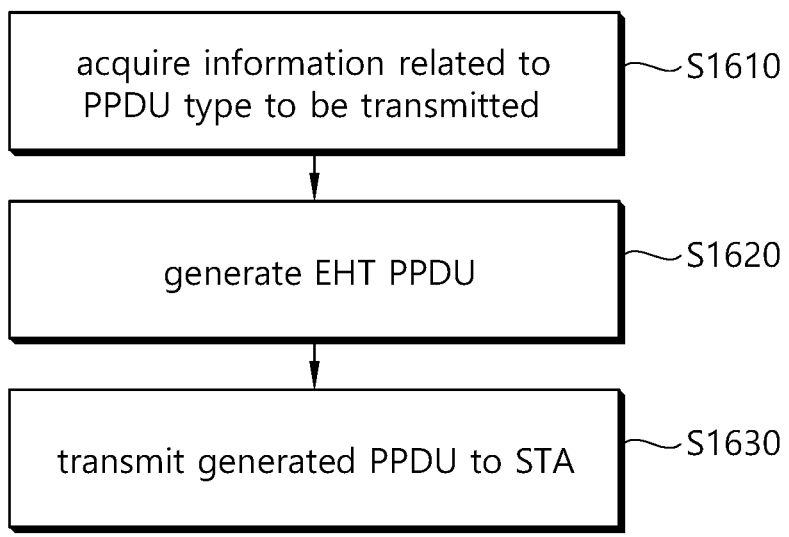
FIG. 16 is a view illustrating a transmission operation to which an example of the present disclosure is applied.

FIG. 16 is a view illustrating a transmission operation to which an example of the present disclosure is applied. The example of FIG. 16 may be performed in a transmitting STA that transmits an EHT PPDU.

In step S1610, the transmitting STA may acquire (or obtain) information related to a PPDU type. For example, when the PPDU type corresponds to the conventional type illustrated in FIG. 9, the transmitting STA may configure the RL-SIG field and the SIG-A field according to the conventional technique. For example, when the acquired PPDU type corresponds to the EHT PPDU, the transmitting STA may generate an EHT PPDU according to the following features.

In step S1620, when the transmitting STA acquires information related to the EHT PPDU type, the transmitting STA may generate a PPDU including the legacy signal field (e.g., L-SIG 1130 of FIG. 11, L-SIG 1230 of FIG. 12, L-SIG 1330 of FIG. 13, L-SIG 1430 of FIG. 14, and L-SIG 1530 of FIG. 15), the control signal field (e.g., One_early_indication_symbol 1240 of FIG. 12, One_early_indication_symbol 1340 of FIG. 13, One_early_indication_symbol 1440 of FIG. 14, and the EHT control field 1540 of FIG. 15)) contiguous to the legacy signal field, and a data field.

The legacy signal field may be transmitted through the first symbol. For example, the legacy signal field may be transmitted for a time of 4 us, which is 1 OFDM symbol length. The control signal field may be transmitted through the second symbol. For example, the control signal field may be transmitted for 4 us time, which is 1 OFDM symbol length.

The legacy signal field and the control signal field may be generated based on BPSK. The legacy signal field may be generated based on the first signal bit. For example, the transmitting STA may perform binary convolutional code (BCC) encoding on 24-bit information at a 1/2 code rate and perform BPSK modulation on the encoded 48-bit information. The control signal field may be generated based on the second signal bit. For example, the transmitting STA may perform BCC encoding on 26-bit information at a 1/2 code rate and perform BPSK modulation on the encoded 52-bit information.

The second signal bit may include first control information related to whether the PPDU is an EHT PPDU. The second signal bit may include a packet indication field indicating first control information (e.g., a packet indication/frame format indication field of FIG. 13). The packet indication field may indicate information related to a type or frame format of a transmitted packet. The first control information may have a first value (e.g., {01}) when the PPDU is an EHT PPDU for a single user. The first control information may have a second value (e.g., {10}) when the PPDU is an EHT PPDU for multiple users.

The second signal bit may include second control information related to whether a bandwidth of the PPDU is higher than or equal to a first bandwidth. The second signal bit may include a bandwidth field indicating second control information (e.g., the BW field of FIG. 13). For example, the second control information may have a length of 1 bit. The second control information may have a first value (e.g., {1}) when the bandwidth of the PPDU is 160 MHz or higher, and may have a second value (e.g., {0}) when the bandwidth of the PPDU is 80 MHz or lower.

Additionally, the PPDU may include an EHT control field (e.g., EHT control field 1250 of FIG. 12, EHT control field 1350 of FIG. 13, first EHT control field of FIG. 14, and second control field 1460 of FIG. 14) contiguous to the control signal field. The EHT control field may be transmitted through a third symbol. The EHT control field may include third control information related to a bandwidth of the PPDU. The bandwidth of the PPDU may be determined based on the second control information and the third control information. For example, the second control information may indicate a case where the bandwidth of the PPDU is 160 MHz or higher. The third control information may indicate one of 160 MHz, 240 MHz, or 320 MHz, which is a bandwidth of 160 MHz or higher. The PPDU may hierarchically indicate information related to the bandwidth of the PPDU through the second control information and the third control information.

In step S1630, the transmitting STA may transmit the generated EHT PPDU to the receiving STA.

Figure 17:
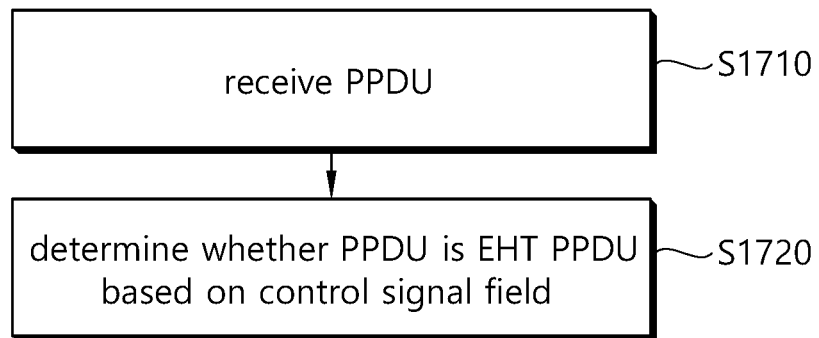
FIG. 17 is a view illustrating a reception operation to which an example of the present disclosure is applied.

FIG. 17 is a view illustrating a reception operation to which an example of the present disclosure is applied. The example of FIG. 17 may be performed in a receiving STA which receives a PPDU.

In step S1710, a receiving STA may receive an EHT PPDU from a transmitting STA. The EHT PPDU may include a legacy signal field (e.g., a legacy signal field (e.g., L-SIG 1130 of FIG. 11, L-SIG 1230 of FIG. 12, L-SIG 1330 of FIG. 13, L-SIG 1430 of FIG. 14, and L-SIG 1530 of FIG. 15), a control signal field (e.g., One_early_indication_symbol 1240 of FIG. 12, One_early_indication_symbol 1340 of FIG. 13, One_early_indication_symbol 1340 of FIG. 14, and EHT control field 1540 of FIG. 15) contiguous to the legacy signal field, and a data field.

In step S1720, the receiving STA may determine whether the PPDU is an EHT PPDU based on the control signal field.

The legacy signal field may be received through a first symbol. For example, the legacy signal field may be received for 4 us time, which is 1 OFDM symbol length. The control signal field may be received through a second symbol. For example, the control signal field may be received for 4 us time, which is 1 OFDM symbol length.

The receiving STA may identify a first signal bit of the legacy signal field based on BPSK. The receiving STA may identify a second signal bit of the control signal field based on the BPSK.

The second signal bit may include first control information related to whether the PPDU is an EHT PPDU. The second signal bit may include a packet indication field (e.g., a packet indication/frame format indication field of FIG. 13) indicating the first control information. The receiving STA may identify information related to a type or frame format of a transmitted packet based on the packet indication field. For example, the receiving STA may identify whether the received PPDU is SU EHT PPDU or MU EHT PPDU based on the first control information.

The second signal bit may include second control information related to whether a bandwidth of the PPDU is higher than or equal to a first bandwidth. The second signal bit may include a bandwidth field (e.g., the BW field of FIG. 13) indicating second control information. For example, the second control information may have a length of 1 bit. When the second control information has a first value (e.g., {1}), the receiving STA may identify that the bandwidth of the PPDU is 160 MHz or higher. When the second control information has a second value (e.g., {0}), the receiving STA may identify that the bandwidth of the PPDU is 80 MHz or lower.

In addition, the PPDU may include an EHT control field (e.g., EHT control field 1250 of FIG. 12, EHT control field 1350 of FIG. 13, and first EHT control field 1450 of FIG. 14, and second control field 1460 of FIG. 14) contiguous to the control signal field. The EHT control field may include third control information related to the bandwidth of the PPDU. The receiving STA may determine the bandwidth of the PPDU based on the second control information and the third control information. For example, the receiving STA may identify that the bandwidth of the PPDU is 160 MHz or higher based on the second control information. The receiving STA may identify that the PPDU has one of 160 MHz, 240 MHz, or 320 MHz, which is a bandwidth of 160 MHz or higher, based on the third control information. The receiving STA may hierarchically identify information related to the bandwidth of the PPDU through the second control information and the third control information.

Figure 18:
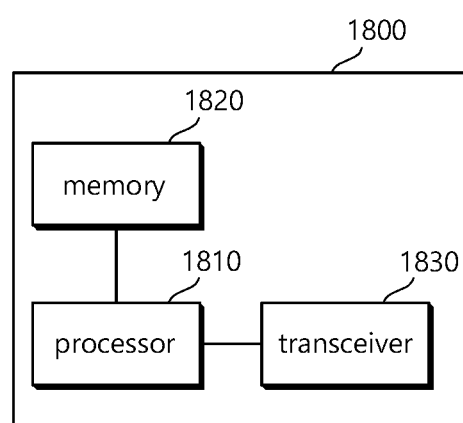
FIG. 18 illustrates a transmitting STA or a receiving STA to which an example of the present disclosure is applied.

FIG. 18 illustrates a transmitting STA or a receiving STA to which an example of the present disclosure is applied.

Referring to FIG. 18, the STA 1800 may include a processor 1810, a memory 1820, and a transceiver 1830. The features of FIG. 18 may be applied to a non-AP STA or an AP STA. The illustrated processor, memory, and transceiver may be implemented as separate chips, or at least two or more blocks/functions may be implemented through a single chip.

The illustrated transceiver 1830 performs a signal transmission/reception operation. Specifically, the transceiver 1830 may transmit and receive IEEE 802.11 packets (e.g., IEEE 802.11a/b/g/n/ac/ax/be, etc.).

The processor 1810 may implement the functions, processes, and/or methods proposed in the present disclosure. Specifically, the processor 1810 may receive a signal through the transceiver 1830, process the received signal, generate a transmission signal, and perform control for signal transmission.

The processor 1810 may include an application-specific integrated circuit (ASIC), another chipset, a logic circuit, and a data processing device. The memory 1820 may include read-only memory (ROM), random access memory (RAM), flash memory, memory card, storage medium, and/or other storage device.

The memory 1820 may store a signal (i.e., a reception signal) received through the transceiver and may store a signal (i.e., a transmission signal) to be transmitted through the transceiver. That is, the processor 1810 may acquire the received signal through the memory 1820 and store the signal to be transmitted in the memory 1820.

Figure 19:
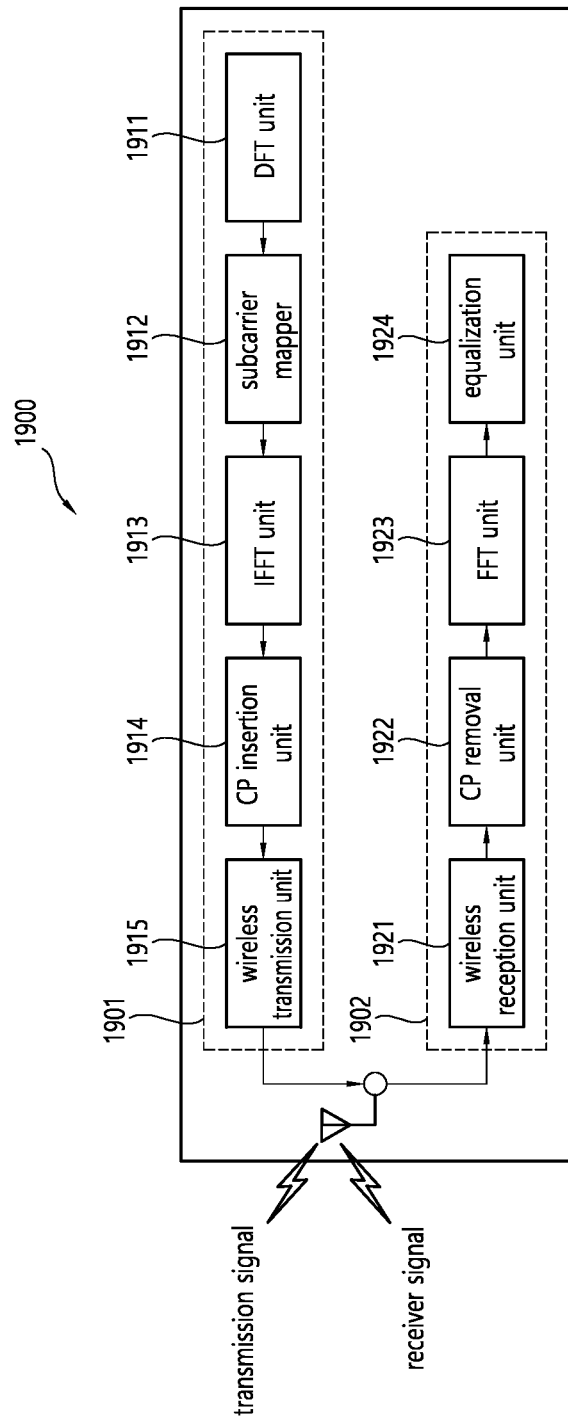
FIG. 19 illustrates another example of a detailed block diagram of a transceiver.

FIG. 19 illustrates another example of a detailed block diagram of a transceiver. Some or all blocks of FIG. 19 may be included in the processor 1810. Referring to FIG. 19, a transceiver 1900 includes a transmission part 1901 and a reception part 1902. The transmission part 1901 includes a discrete Fourier transform (DFT) unit 1911, a subcarrier mapper 1912, an IDFT/(inverse fast Fourier transform) IFFT unit 1913, a CP insertion unit 1914, and a wireless transmission unit 1915. The transmission part 1901 may further include a modulator. In addition, for example, the transmission part 1901 may further include a scramble unit (not shown), a modulation mapper (not shown), a layer mapper (not shown), and a layer permutator (not shown), and these components may be arranged before the DTF unit 1911. That is, in order to prevent an increase in a peak-to-average power ratio (PAPR), the transmission part 1901 allows information to first go through first the DFT unit 1911 before mapping a signal to a subcarrier. After a signal spread by the DFT unit 1911 (or precoded in the same sense) is mapped through the subcarrier mapper 1912, the mapped signal goes through the IDTF/IFFT unit 1913 so as to be generated as a signal on a time axis.

The DFT unit 1911 performs DFT on input symbols and outputs complex-valued symbols. For example, when Ntx symbols are input (here, Ntx is a natural number), a DFT size is Ntx. The DFT unit 1911 may be referred to as a transform precoder. The subcarrier mapper 1912 maps the complex-valued symbols to each subcarrier in a frequency domain. The complex symbols may be mapped to resource elements corresponding to a resource block allocated for data transmission. The subcarrier mapper 1912 may be referred to as a resource element mapper. The IDFT/IFFT unit 1913 performs IDFT/IFFT on an input symbol and outputs a baseband signal for data as a time domain signal. The CP insertion unit 1914 copies a rear part of the base band signal for data and inserts it into a front part of the base band signal for data. Inter-symbol interference (ISI) and inter-carrier interference (ICI) may be prevented through CP insertion, so that orthogonality may be maintained even in a multipath channel.

Meanwhile, the receiving part 1902 includes a wireless reception unit 1921, a CP removal unit 1922, an FFT unit 1923, an equalization unit 1924, and the like. The wireless reception unit 1921, the CP removing unit 1922, and the FFT unit 1923 of the receiving part 1902 perform reverse functions of the wireless transmission unit 1915, the CP inserting unit 1914, and the IFF unit 1913 of the transmitting part 1901. The receiving part 1902 may further include a demodulator.

In addition to the illustrated blocks, the transceiver of FIG. 19 may include a reception window controller (not shown) extracting a part of a received signal and a decoding operation processing unit (not shown) performing a decoding operation on a signal extracted through a reception window.

The technical features of the present disclosure described above may be applied to various applications or business models. For example, the technical features described above may be applied for wireless communication in a device supporting artificial intelligence (AI).

Artificial intelligence refers to a field of researching artificial intelligence or methodology for creating artificial intelligence, and machine learning refers to a field that defines various problems dealt with in the field of artificial intelligence and studies methodologies to solve the problems. Machine learning is also defined as an algorithm that improves performance of a task through continuous experience.

An artificial neural network (ANN), as a model used in machine learning, may refer to an overall model including artificial neurons (nodes) that form a network by combining synapses and having problem-solving capabilities. The artificial neural network may be defined by a connection pattern between neurons of different layers, a learning process for updating model parameters, and an activation function for generating an output value.

The artificial neural network may include an input layer, an output layer, and optionally one or more hidden layers. Each layer includes one or more neurons, and the artificial neural network may include neurons and synapses connecting the neurons. In an artificial neural network, each neuron may output a function value of an activation function for input signals, weights, and biases input through synapses.

Model parameters refer to parameters determined through learning, and include weights of synaptic connections and biases of neurons. In addition, a hyperparameter refers to a parameter that should be set before learning in a machine learning algorithm, and includes a learning rate, iteration count, mini-batch size, and initialization function.

The purpose of training artificial neural networks may be considered as determining model parameters that minimize a loss function. The loss function may be used as an index for determining an optimal model parameter in the learning process of the artificial neural network.

Machine learning may be classified into supervised learning, unsupervised learning, and reinforcement learning according to a learning method.

Supervised learning may refer to a method of training an artificial neural network in a state where a label for leaning data is given, and a label may refer to a correct answer (or result value) that the artificial neural network should infer when the leaning data is input to the artificial neural network. Unsupervised learning may refer to a method of training an artificial neural network in a state where a label for learning data is not given. Reinforcement learning may refer to a learning method in which an agent defined in a certain environment learns to select an action or an action sequence that maximizes a cumulative reward in each state.

Among artificial neural networks, machine learning implemented as a deep neural network (DNN) including a plurality of hidden layers may also be referred to as deep learning, and deep learning is a part of machine learning. Hereinafter, machine learning is used in the sense including deep learning.

In addition, the technical features described above may be applied to wireless communication of a robot.

A robot may refer to a machine that automatically processes or operates a given task by its own capabilities. In particular, a robot having a function of recognizing an environment and performing an operation by self-determining may be referred to as an intelligent robot.

Robots may be classified as industrial, medical, household, and military robots depending on the purpose or field of use. The robot may include a driving unit including an actuator or a motor to perform various physical operations such as moving a robot joint. In addition, a movable robot may include a wheel, a brake, a propeller, and the like in the driving unit and may travel on the ground or fly in the air through the driving unit.

In addition, the technical features described above may be applied to a device supporting extended reality.

Extended reality collectively refers to virtual reality (VR), augmented reality (AR), and mixed reality (MR). A VR technology provides only CG images of objects or backgrounds of a real world, an AR technology provides virtually created CG images on top of real object images, and an MR technology is a computer graphic technology that mixes and combines virtual objects in the real world.

The MR technology is similar to the AR technology in that it shows real and virtual objects together. However, in the AR technology, virtual objects are used to complement real objects, whereas in the MR technology, virtual objects and real objects are used with equal characteristics.

An XR technology may be applied to head-mount displays (HMD), head-up displays (HUD), mobile phones, tablet PCs, laptops, desktops, TVs, digital signage, and the like, and a device to which the XR technology is applied may be referred to as an XR device.

What is claimed is:

1. A method for use in a wireless local area network (WLAN) system, the method comprising:
    receiving, by a receiving station (STA), a physical protocol data unit (PPDU),
    wherein the PPDU includes a legacy signal field, a control signal field contiguous to the legacy signal field, and a data field,
    wherein the legacy signal field is received through a first symbol, and the control signal field is received through a second symbol,
    wherein the legacy signal field and the control signal field are generated based on binary phase shift keying (BPSK),
    wherein four extra subcarriers are inserted for the legacy signal field, and indices of the four extra subcarriers are set as {−28, −27, +27, +28},
    wherein the legacy signal field includes four pilot subcarriers,
    wherein the legacy signal field is generated based on at least one first signal bit,
    wherein the control signal field is generated based on at least one second signal bit,
    wherein the at least one second signal bit includes at least one packet indication bit related to whether the PPDU is an extremely high throughput (EHT) PPDU, first information related to a transmission opportunity (TXOP), and second information related to a bandwidth of the PPDU;
    wherein the control signal field is received based on a plurality of subcarriers with indices from −28 to +28, and the plurality of subcarriers include four pilot subcarriers and one subcarrier at an index of 0; and
    determining, by the receiving STA, whether the PPDU is an EHT PPDU based on the control signal field.

2. The method of claim 1, wherein the at least one packet indication bit identifies that the PPDU is the EHT PPDU.

3. The method of claim 1, wherein the at least one packet indication bit has a value of zero for the EHT PPDU.

4. The method of claim 1, wherein the at least one packet indication bit has a non-zero value for a reserved purpose.

5. The method of claim 1, wherein the legacy signal field and the control signal field are encoded based on a binary convolutional coding (BCC) with a coding rate of 1/2.

6. The method of claim 1, wherein the PPDU further includes an EHT control field being contiguous to the control signal field.

7. The method of claim 1, wherein the PPDU is generated by an access point (AP) station or a non-AP station.

8. The method of claim 1, wherein the one subcarrier is a direct current (DC) tone.

9. A station in a wireless local area network (WLAN) system, the station comprising:
 at least one processor; and
 at least one computer memory operatively connected to the at least one processor and storing instructions that, based on being executed by the at least one processor, perform operations comprising:
 receiving a physical protocol data unit (PPDU),
 wherein the PPDU includes a legacy signal field, a control signal field contiguous to the legacy signal field, and a data field,
 wherein the legacy signal field is received through a first symbol, and the control signal field is received through a second symbol,
 wherein the legacy signal field and the control signal field are generated based on binary phase shift keying (BPSK),
 wherein four extra subcarriers are inserted for the legacy signal field, and indices of the four extra subcarriers are set as {−28, −27, +27, +28},
 wherein the legacy signal field includes four pilot subcarriers,
 wherein the legacy signal field is generated based on at least one first signal bit,
 wherein the control signal field is generated based on at least one second signal bit, and
 wherein the at least one second signal bit includes at least one packet indication bit related to whether the PPDU is an extremely high throughput (EHT) PPDU, first information related to a transmission opportunity (TXOP), and second information related to a bandwidth of the PPDU;
 wherein the control signal field is received based on a plurality of subcarriers with indices from −28 to +28, and the plurality of subcarriers include four pilot subcarriers and one subcarrier at an index of 0; and
 determining whether the PPDU is an EHT PPDU based on the control signal field.

10. The station of claim 9, wherein the at least one packet indication bit identifies that the PPDU is the EHT PPDU.

11. The station of claim 9, wherein the at least one packet indication bit has a value of zero for the EHT PPDU.

12. The station of claim 9, wherein the at least one packet indication bit has a non-zero value for a reserved purpose.

13. The station of claim 9, wherein the legacy signal field and the control signal field are encoded based on a binary convolutional coding (BCC) with a coding rate of 1/2.

14. The station of claim 9, wherein the PPDU further includes an EHT control field being contiguous to the control signal field.

15. The station of claim 9, wherein the PPDU is generated by an access point (AP) station or a non-AP station.

16. The station of claim 9, wherein the one subcarrier is a direct current (DC) tone.

* * * * *